United States Patent
Ishigami et al.

(10) Patent No.: US 7,254,887 B2
(45) Date of Patent: Aug. 14, 2007

(54) FUEL CELL SEPARATOR MANUFACTURING METHOD AND MANUFACTURING APPARATUS

(75) Inventors: Osamu Ishigami, Sayama (JP); Tetsuya Kondo, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 127 days.

(21) Appl. No.: 10/499,048

(22) PCT Filed: Dec. 12, 2002

(86) PCT No.: PCT/JP02/13026

§ 371 (c)(1),
(2), (4) Date: Jun. 16, 2004

(87) PCT Pub. No.: WO03/052848

PCT Pub. Date: Jun. 26, 2003

(65) Prior Publication Data

US 2005/0089742 A1    Apr. 28, 2005

(30) Foreign Application Priority Data

Dec. 18, 2001  (JP)  ............... 2001-385206
Dec. 18, 2001  (JP)  ............... 2001-385216
Dec. 18, 2001  (JP)  ............... 2001-385227
Jan. 30, 2002  (JP)  ............... 2002-022436

(51) Int. Cl.
*H01R 43/00*  (2006.01)
*H01M 8/00*  (2006.01)
*H01M 2/00*  (2006.01)

(52) U.S. Cl. ............... 29/825; 429/12; 429/34

(58) Field of Classification Search .......... 429/12, 429/34
See application file for complete search history.

(56) References Cited

U.S. PATENT DOCUMENTS

| | | | | | |
|---|---|---|---|---|---|
| 2,435,889 | A | * | 2/1948 | Kerridge | .............. 430/295 |
| 3,808,878 | A | * | 5/1974 | Dini | .............. 73/620 |
| 6,379,476 | B1 | * | 4/2002 | Tarutani et al. | .............. 148/325 |

FOREIGN PATENT DOCUMENTS

| | | |
|---|---|---|
| JP | 2-109332 | 4/1990 |
| JP | 8-180883 | 7/1996 |
| JP | 10-209114 | 8/1998 |
| JP | 2000-164228 | 6/2000 |
| JP | 2000-323152 | 11/2000 |
| JP | 2000-328200 | 11/2000 |
| JP | 2001-032056 | 2/2001 |
| JP | 2001-214286 | 8/2001 |
| JP | 2001-283872 | 10/2001 |

* cited by examiner

*Primary Examiner*—Tracy Dove
*Assistant Examiner*—Helen O. Chu
(74) *Attorney, Agent, or Firm*—Rankin, Hill, Porter & Clark LLP

(57) ABSTRACT

A fuel cell separator manufacturing method including the steps of removing an abnormal layer (91) arising at the surface layer of a metal material for use as a separator (20) when it is rolled, exposing portions of conductors (92) included in a surface layer part of the metal material itself to project, and carrying out a passivation treatment on the surface layer part of the metal material itself. The steps of removing the abnormal layer and exposing portions of the conductors are possible in the same process, chemically or electro-chemically. Therefore, the number of steps can be cut and increased productivity and reduced cost of separators can be achieved.

3 Claims, 23 Drawing Sheets

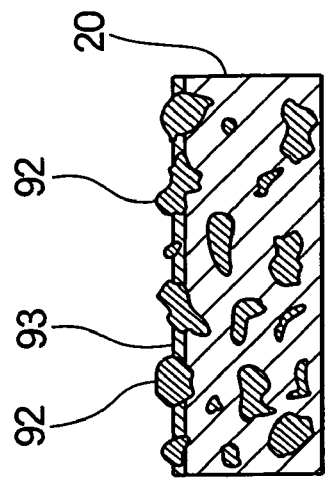
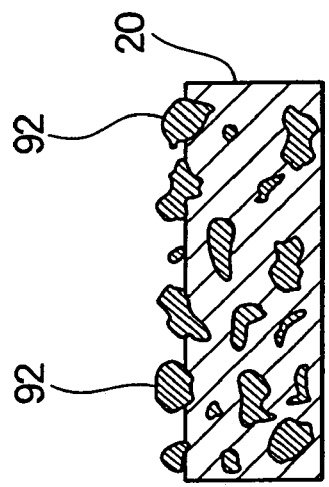
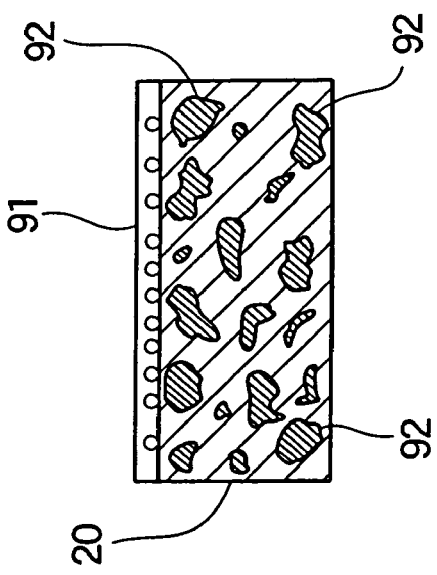

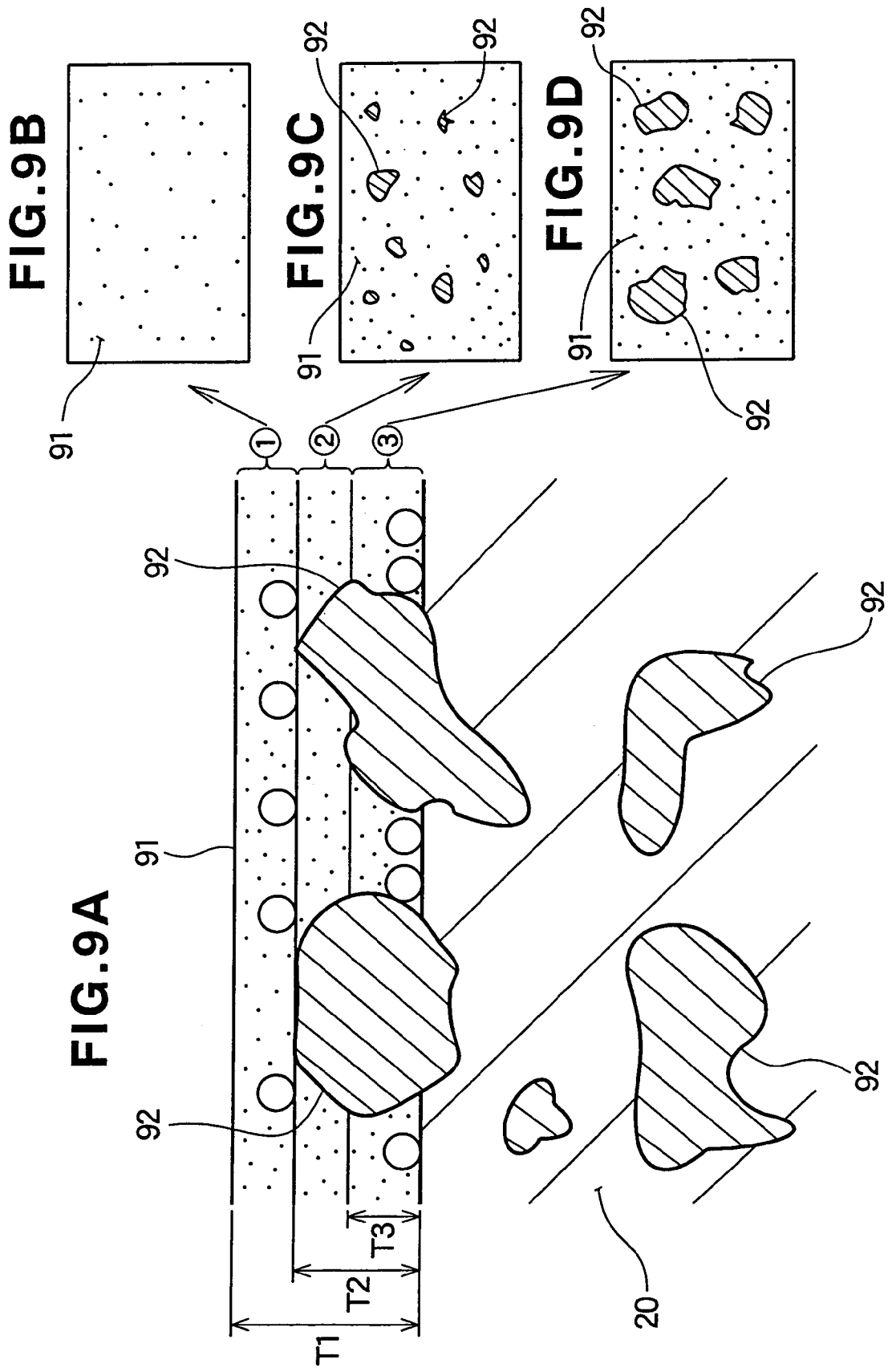

FUEL CELL SEPARATOR MANUFACTURING METHOD AND MANUFACTURING APPARATUS

TECHNICAL FIELD

This invention relates to a fuel cell separator manufacturing method and manufacturing apparatus suitable for achieving productivity improvement, cost reduction, quality improvement and quality stabilization of a metal separator.

BACKGROUND ART

Solid high polymer electrolyte fuel cell units are of a structure such that the desired output is obtained by stacking together multiple fuel cells. Preferred separators that divide these fuel cells are metal materials, which compared to polymer materials are stronger with respect to pressure applied at the time of stacking and are advantageous to size reduction after stacking.

Known fuel cells employing metal separators of this kind include for example ①  JP-A-8-180883, "Solid High Polymer Electrolyte Fuel Cell" (hereinafter, Related Art ① ), ② JP-A-2000-164228, "Solid High Polymer Electrolyte Fuel Cell Separator and Manufacturing Method Thereof" (hereinafter, Related Art ② ).

In Related Art ① , a single cell of a fuel cell is disclosed wherein electrode films are disposed on both sides of a solid high polymer electrolyte film, these electrode films are sandwiched with for example stainless steel separators, and the edge parts of the separators are sealed with seals.

In Related Art ② , a single cell of a fuel cell is disclosed wherein an anode electrode and a cathode electrode are disposed on either side of a solid high polymer film, and the anode electrode and the cathode electrode are sandwiched by separators with for example stainless steel as their base material.

In the technology of the publications of Related Art ① and ② , when for example cold rolling is carried out on stainless steel to become the material of a separator to bring the stainless steel to a predetermined thickness, at the surface layer part of the stainless steel, as a result of the rolling, an abnormal layer made up of oxides and of intermetallic compounds which had been included in the stainless steel sheet, crushed to a small particle size, is formed. Because the conductivity of this abnormal layer is not good, to make the electrical contact resistance of the separator small it is necessary for it to be removed.

To do this, a separator manufacturing method having a step of removing an abnormal layer of stainless steel like this has been conceived. This technology will be described below.

With reference to FIG. 21 the main points of the manufacture of a metal separator of related art will be explained in order.

1. Abnormal Layer Removal

A metal material 400 constituting the material of a separator is rolled before being press-formed to a predetermined shape. When the metal material 400 is rolled, an abnormal layer 401 is formed at the surface layer of the metal material 400.

2. Abnormal Layer Removal Etching

The above-mentioned abnormal layer 401 is removed by etching.

3. First Passivation Treatment

To prevent corrosion of the surface of the metal material 400, a first passivation treatment is carried out and a first passivation film 402 is formed.

4. Exposure Etching

Because particulate conductors 403 . . . ( . . . denotes a plurality. The same applies hereinafter.) consisting of the above-mentioned intermetallic compounds naturally included in the metal material 400 are good electrical conductors, with the object of reducing the electrical contact resistance between the separator and an adjacent separator or electrode when the metal material 400 is made a separator and stacked in a fuel cell, exposing of the conductors 403 . . . is carried out. To perform this exposing, etching is carried out.

5. Second Passivation Treatment

After the exposing of the conductors 403 . . . , so that the surface of the metal material 400 does not corrode a second passivation treatment is carried out, and a second passivation film 405 is formed.

This completes the manufacture of the separator.

The separator manufacturing method described above will be explained in detail with reference to FIG. 22. STXXX indicates a step number.

ST101 A metal material press-formed after rolling is degreased. The process liquid is an aqueous surfactant solution, the treatment temperature is 30° C., and the treatment time is 1 minute.

ST102 The metal material is washed. The treatment time is 1 minute.

ST103 The abnormal layer formed at the time of rolling is removed by etching. The process liquid is a solution of aqua regia and a surfactant, the treatment temperature is 98° C., and the treatment time is 60 minutes.

ST104 The metal material is washed. The treatment time is 1 minute.

ST105 To prevent corrosion of the surface of the metal material, a first passivation treatment is carried out. The process liquid is 50% nitric acid, the treatment temperature is 50° C. and the treatment time is 30 minutes.

ST106 The metal material is washed. The treatment time is 1 minute.

ST107 An etching is carried out to expose the conductors in the metal material. The process liquid is a solution of 20% nitric acid and 8% hydrofluoric acid, the treatment temperature is 30° C. and the treatment time is 10 minutes.

ST108 The metal material is washed. The treatment time is 1 minute.

ST109 To prevent corrosion of the surface of the metal material a second passivation treatment is carried out. The process liquid is 50% nitric acid, the treatment temperature is 50° C. and the treatment time is 30 minutes.

ST110 The metal material is washed. The treatment time is 1 minute.

ST111 The metal material is dried. The treatment time is 1 minute.

This completes the manufacture of the separator. The total process time is 137 minutes.

In the separator manufacturing method described above, by the abnormal layer being removed chemically by etching, and by exposing of the conductors also being carried out by etching, the contact resistance of the separator is made small.

However, in the above-mentioned FIG. 22, the required time from the degreasing of ST101 to the drying of ST111 is 137 minutes in total, and because the number of process steps is large the number of different process liquids and the number of process tanks for holding the process liquids are large and much labor is taken in the temperature management of the process liquids, and consequently, to achieve productivity improvement and cost reduction of metal separators, a reduction in the above-mentioned number of process steps has been needed.

When in the above-mentioned ST103 the intended abnormal layer removal etching is not achieved, an abnormal layer remains at the surface layer of the metal material, and it is likely that this will affect the conductor exposure etching of ST107 and exposing of the conductors will not be fully effected, and when exposing of the conductors is not sufficient, when the manufactured separator is stacked in the assembly of a fuel cell, the electrical contact resistance between separators or between separators and electrodes will be large and a sufficient output of the fuel cell will not be obtained. This is the same when the intended exposing of conductors is not achieved in ST107.

To avoid this, if it can be checked during the separator manufacturing process described above whether or not the intended treatment has been achieved, the quality of the separators can be increased and the quality of the separators can be stabilized, and when the intended processing has not been carried out on a metal material the waste of continuing processing with subsequent steps can also be eliminated.

Also, the following kind of metal separator manufacturing method will be described.

FIG. 23 shows a process tank 411 filled with a process liquid 412 and a metal material 414 (a material to eventually become a separator) held in a frame-shaped member 413 immersed in this process liquid 412. 415 is a wire suspending the frame-shaped member 413.

In a fuel cell, the separator accounts for most of the cost. This is because the separator requires a structure finely formed with flow passages for fuel gas and oxidant gas and cooling water, and surface treatment to prevent corrosion by electrolytes. Accordingly, if the productivity of the separators is raised and their cost reduced, the cost of fuel cells is greatly reduced and a contribution is made to the spread of fuel cell vehicles.

In FIG. 23, for example when the metal material 414 is treated with the process liquid 412 of the above-mentioned process tank 411, (1) to quicken the treatment of the metal material 414 and also to effect it uniformly, it is effective to agitate the process liquid 412 with an agitating device, but when there are multiple process tanks 411, an agitating device must be provided for each of them, leading to increased cost, and (2) if the carrying of the metal material 414 to the process tanks 411 and the holding of the metal material 414 for the immersion of the carried metal material 414 in the process liquid 412 are not coordinated well, the flow of the production process cannot be made smooth, and the production time increases, and (3) if the number of metal materials processed at once is low, the number of units produced per unit time is low, and if this can be improved, productivity improvement and cost reduction of separators can be achieved.

DISCLOSURE OF THE INVENTION

It is an object of the invention to achieve productivity improvement, cost reduction, quality improvement and quality stabilization of metal separators, and to eliminate waste in the manufacturing process.

In a first aspect, the invention provides a fuel cell separator manufacturing method comprising an abnormal layer removing step of removing an abnormal layer arising at the surface layer of a metal material to be used as a separator when it is rolled; a conductor exposing step of causing portions of conductors included in a surface layer part of the metal material itself to project; and a passivation treatment step of carrying out a passivation treatment on the surface layer part of the metal material itself.

The removing of the abnormal layer with the abnormal layer removing step and the removing of the surface layer part of the separator with the conductor exposing step are possible in the same process, chemically or electro-chemically, and the number of steps can be cut and increased productivity and reduced cost of separators can be achieved.

Preferably, the method of the invention comprises: a step of rolling a metal material with rolling means; a step of forming the rolled material to a predetermined shape with pressing means; the abnormal layer removing step and the conductor exposing step carried out by etching; and the passivation treatment step. The abnormal layer removal step and the conductor exposing step are carried out in a single etching.

By performing in one etching process the abnormal layer removal and exposing of conductors which in related art have been carried out in separate etching processes, the number of steps in the process can be reduced and the productivity of metal separators can be raised and their manufacturing cost cut.

Preferably, the above-mentioned etching process is carried out with the temperature and composition of the etching liquid selected in correspondence with the state of the abnormal layer.

By selecting constituents with a stronger abnormal layer removing action as the constituents of the etching liquid and raising the temperature of the etching liquid when the abnormal layer is formed so thick that conductors cannot be confirmed by visual observation, and selecting constituents with a weaker abnormal layer removing action as the constituents of the etching liquid and making the temperature of the etching liquid low when the abnormal layer is formed thin enough that conductors can be confirmed by visual observation, it is possible to carry out the manufacture of a metal separator efficiently.

Preferably, the etching is carried out with the agitation method changed in correspondence with the state of the abnormal layer.

By making the etching liquid agitation speed high and making the agitation time long when the abnormal layer is formed so thick that conductors cannot be confirmed by visual observation, and making the etching liquid agitation speed low and making the agitation time short when the abnormal layer is formed thin enough that conductors can be confirmed by visual observation, it is possible to carry out the manufacture of a metal separator efficiently.

Preferably, the etching is carried out with the concentration of the etching liquid changed in correspondence with the state of the abnormal layer.

By making the etching liquid concentration high when the abnormal layer is formed so thick that conductors cannot be confirmed by visual observation and making the etching liquid concentration low when the abnormal layer is formed thin enough that conductors can be confirmed by visual observation, it is possible to carry out the manufacture of a metal separator efficiently.

Preferably, the etching is carried out in a liquid tank selected from among a plurality of liquid tanks holding etching liquids of different compositions.

By for example selecting a liquid tank with the etching liquid concentration raised or the etching liquid concentration and temperature both raised when the abnormal layer is formed so thick that conductors cannot be confirmed by visual observation and for example selecting a liquid tank with the etching liquid concentration weakened or the etching liquid concentration weakened and the temperature lowered when the abnormal layer is formed thin enough that conductors can be confirmed by visual observation, it is possible to carry out the manufacture of a metal separator efficiently.

Preferably, the removal of the abnormal layer is promoted by a granular material being mixed with the etching liquid and the etching liquid being agitated.

With a granular material it is possible to quicken the removal of the abnormal layer and shorten the treatment time.

Preferably, the method of the invention comprises: the abnormal layer removing step; a first checking step of checking the weight of the metal material after the abnormal layer is removed; a first passivation treatment step of carrying out a passivation treatment for corrosion resistance on the metal material; the conductor exposing step carried out by etching; a second checking step of checking the weight of the metal material after this step; and a second passivation treatment step of carrying out a passivation treatment again after this, and confirmation of the respective weights is carried out in the first checking step and the second checking step.

If the weight of the metal material measured in the first checking step and its weight before the abnormal layer removal are compared, the weight of abnormal layer removed can be confirmed, and if the weight of the metal material measured in the second checking step and the weight measured in the first checking step are compared, an exposure weight constituting a weight of metal material removed to expose the conductors can be confirmed, and an improvement in the quality of the metal material and stabilization of the quality can be achieved.

Preferably, the first checking step and the second checking step are carried out after the metal material is washed and dried.

By the first checking step and the second checking step being carried out after the metal material is washed and dried, matter adhered to the metal material surface can be removed, and the measurement accuracy of the weight of the metal material in the first checking step and the second checking step can be raised.

Preferably, in the case of a metal material whose weight obtained in the first checking step or the second checking step falls outside a predetermined range, the subsequent steps are not carried out.

By not carrying out subsequent steps on a metal material whose weight obtained in the first checking step or the second checking step fell outside a predetermined range, it is possible to eliminate the waste of carrying out steps on that metal material after the first checking step or the second checking step.

Preferably, the determination of whether or not the weight obtained in the first checking step and the second checking step is within a predetermined range is carried out by automatic determining means.

By carrying out the determination of whether or not the weight obtained in the first checking step and the second checking step is within a predetermined range by automatic determining means, it is possible to achieve automation of the checking steps, and, for example if the carrying of the metal material is also automated, the metal material manufacturing process can be made unmanned.

Preferably, a separator is manufactured from: a step of press-forming the metal material to a predetermined shape; a step of holding a plurality of such formed metal materials on a cylindrical holding jig; a step of immersing the held metal materials in a process liquid contained in a process tank and agitating the process liquid with the metal material by driving the cylindrical holding jig with driving means; the abnormal layer removing step; the conductor exposing step; the passivation treatment step; and a step of removing the metal materials from the process tank and drying them.

By agitating the process liquid with the metal materials by driving the cylindrical holding jig, the treatment of the metal materials can be quickened and the treatment can be carried out uniformly. Therefore, separators of superior quality can be manufactured efficiently.

Because the metal materials can be carried to the process tanks with the cylindrical holding jig, and the holding of the metal materials, the carrying and the agitation can be carried out continuously without the metal materials being removed part-way through the production process, the separator production time can be shortened.

Also, multiple metal materials held on the cylindrical holding jig can be processed at once, and the number of units produced can be increased.

Thus, by means of these improvements the productivity of separators can be raised and the cost of separators can be lowered.

Preferably, the metal materials are held by being fitted in frame members provided on an outer face of the cylindrical holding jig.

By the metal materials being held by being fitted in frame members, larger areas of the surfaces of the metal materials can be processed, and the metal materials can be treated effectively.

Preferably, it is made up of: a step of rolling the metal material with rolling means; a step of forming the rolled material to a predetermined shape with pressing means; the abnormal layer removing step; the conductor exposing step; and the passivation treatment step, and the abnormal layer removing step and the conductor exposing step are carried out by electrolytic etching and this electrolytic etching step and the passivation treatment step are carried out consecutively using electrical potential control.

Whereas in related art the removal of the abnormal layer of the metal material for use as a separator and the exposing of conductors and the passivation treatment have been carried out in separate steps, in this invention, by performing them consecutively using electrical potential control, the number of steps in the process can be reduced and the process time can be shortened and the productivity of metal separators can be raised and their manufacturing cost cut.

Preferably, the potential control, when the metal material is made an anode and an electrode facing this anode is made a cathode, makes the potential difference between the anode and the cathode large in the electrolytic etching and makes the potential difference between the anode and the cathode small in the passivation treatment.

By making the potential difference large and creating a super-passive state at the time of the electrolytic etching it is possible to make the abnormal layer of the metal material and the surface layer part of the metal material itself easy to remove and make the exposing of the conductors easy, and by making the potential difference small and creating a passive state at the time of the passivation treatment it is possible to make the formation of a passivation film on the metal material easy.

Preferably, in the electrolytic etching, as well as the potential difference between the anode and the cathode being made large, the current density is kept constant.

Whereas for example when the potential difference is made large and also the potential difference is made constant, as the electrolytic etching time elapses, a film in the super-passive region is gradually formed on the surface of the metal material, and current ceases to flow and the electrolytic etching reaction slows down, by potential control being carried out so as to keep the current density constant as in this invention, the electrolytic etching reaction can be kept going well.

A second aspect of the invention provides a fuel cell separator manufacturing apparatus for manufacturing a separator by press-forming a rolled metal material to a predetermined shape and using etching to remove an abnormal layer arising in the metal material in the rolling and carry out exposing to cause portions of conductors included in a surface layer part of the metal material itself to project and carrying out a passivation treatment on the surface layer part of the metal material itself, the manufacturing apparatus comprising: a degreasing tank for degreasing the rolled metal material; an etching tank for carrying out the etching; a passivation treatment tank for carrying out the passivation treatment; cleaning tanks for removing respective process liquids from the metal material after the degreasing, after the etching and after the passivation treatment; a carrying apparatus for carrying the metal material to these tanks; a driving device for driving the metal material to agitate the process liquids in the tanks with the carried metal material itself, and a control unit for controlling the carrying apparatus and the driving device.

Compared to related art a separator can be manufactured with a simpler construction, and the cost of the separator manufacturing apparatus can be reduced.

Preferably, the manufacturing apparatus comprises an abnormal layer removal tank for removing the abnormal layer, a passivation treatment tank for carrying out the passivation treatment, a conductor exposing tank for carrying out the exposing of conductors, weight measuring means for measuring the weight of the metal material after the abnormal layer removal and after the conductor exposure, and automatic determining means for determining on the basis of weight information from this weight measuring means whether or not the weight is in a predetermined range.

After the metal material abnormal layer removal or after the conductor exposure, for example, when it is determined by the automatic determining means that the weight of the metal material measured by the weight measuring means is not within a predetermined range, that metal material can be removed from the production process, and it is possible to stably manufacture separators of good quality only.

Because metal materials whose weight is not within a predetermined range are removed from the production process, the waste of continuing the manufacture of those metal materials can be eliminated.

Preferably, the manufacturing apparatus comprises an etching tank for carrying out etching, a passivation treatment tank for carrying out passivation treatment, a cylindrical holding jig provided with frame members on an outer face thereof to hold a plurality of metal materials to be processed in the etching tank and the passivation treatment tank, driving means for driving the cylindrical holding jig to agitate process liquids of the etching tank and the passivation treatment tank with the metal materials held in this cylindrical holding jig, and carrying means for carrying the cylindrical holding jig to the etching tank and the passivation treatment tank.

The cylindrical holding jig holding the metal materials can be used both as a metal material carrying tool and as a process liquid agitating tool, and compared to a case wherein these functions are performed by separate devices the number of parts can be reduced and the cost of the separator manufacturing apparatus can be reduced. And, because multiple metal materials can be held, carried, and agitated at once, the productivity of separators can be raised and the cost of separators can be lowered.

Preferably, the manufacturing apparatus comprises a process tank filled with a process liquid and having an electrode provided in the process liquid to electrolytically etch the metal material, electricity supply means for supplying electricity between a metal material immersed in the process liquid in this process tank and the electrode, current density detecting means for detecting the current density during the supply of electricity with this electricity supply means, potential control means for controlling the potential difference between the metal material and the electrode in correspondence with the current density detected by this current density detecting means, and a timer for sending a time signal to the potential control means to effect electricity supply for a predetermined time.

Compared to related art, separators can be manufactured with a simple construction, and the cost of the separator manufacturing apparatus can be reduced.

BRIEF DESCRIPTION OF THE DRAWINGS

FIG. 8A through FIG. 8C are first action views illustrating the separator manufacturing method of the second embodiment of the invention, FIG. 8A being a sectional view showing an abnormal layer formed on a separator workpiece, FIG. 8B being a sectional view showing the abnormal layer removed and conductors exposed, and FIG. 8C being a sectional view showing a passivation film formed on the separator workpiece;

FIG. 9A through FIG. 9D are second action views illustrating the separator manufacturing method of the second embodiment of the invention, FIG. 9A being an enlarged sectional view of a main part of the separator workpiece, FIG. 9B being a view seen with a metal microscope of the surface of the separator workpiece in a range where the thickness of the abnormal layer is T1 to T2, FIG. 9C being a view seen with a metal microscope of the surface of the separator workpiece in a range where the thickness of the abnormal layer is T2 to T3, and FIG. 9D being a view seen with a metal microscope of the surface of the separator workpiece in a range where the thickness of the abnormal layer is below T3 and exceeds T=0;

BEST MODE FOR CARRYING OUT THE INVENTION

Figure 1:
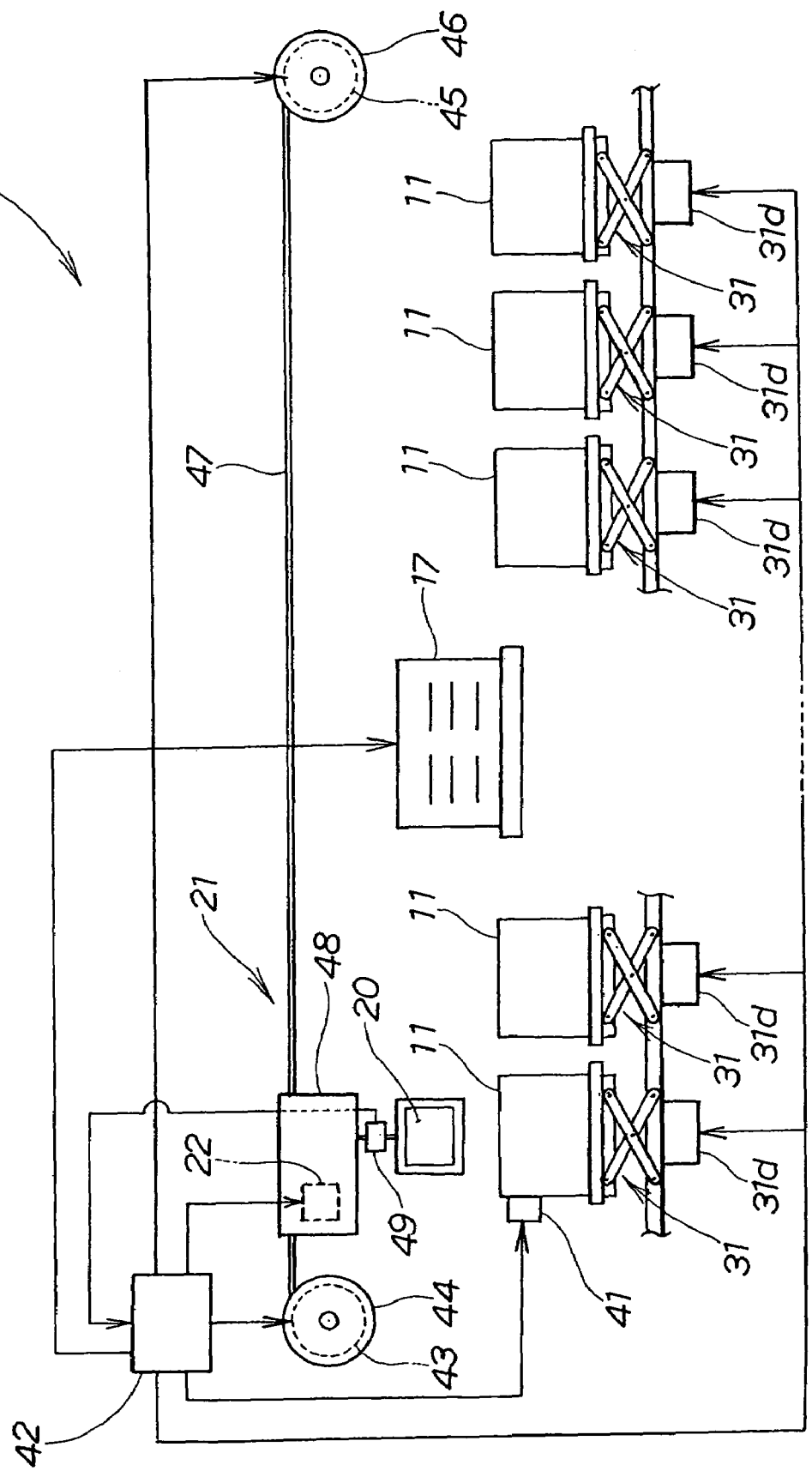
FIG. 1 is a schematic view illustrating a fuel cell separator manufacturing apparatus according to a first embodiment of the invention.

As shown in FIG. 1, a separator manufacturing apparatus 10 is made up of process tanks 11 holding process liquids for carrying out treatments which will be further discussed later, a dryer 17 for carrying out drying, a carrying apparatus 21 for carrying a separator workpiece 20 to the positions of the process tanks 11 . . . and the dryer 17, a driving device 22 for driving an electric motor to raise and lower a separator workpiece 20 being moved by this carrying apparatus 21, lifters 31 . . . for raising and lowering the process tanks 11 . . . to immerse the separator workpiece 20 in the process liquids, liquid temperature adjusting devices 41 . . . (although each of the process tanks 11 . . . is provided with one of these liquid temperature control devices 41, in the figure one is only drawn on one process tank 11) for adjusting the temperature of process liquid in each process tank 11, and a control unit 42 for controlling the dryer 17, the carrying apparatus 21, the driving device 22, the lifters 31 . . . and the liquid temperature control devices 41. 31d. are lifter drivers for driving the lifters 31 . . . .

The process tanks 11 . . . are lined up in correspondence with steps shown in FIG. 4 and FIG. 5 (except for weighing steps and drying steps) which will be described later, and for example the leftmost process tank 11 in the figure is a process tank for a degreasing step constituting a first step in the production process.

The separator workpiece 20 is eventually made into a separator by the separator manufacturing apparatus 10, and is made by rolling a metal material, for example stainless steel (particularly austenite stainless steel) into a thin sheet and then press-forming channels and holes in it for passing fuel gas, oxidant gas and cooling water in a fuel cell.

The dryer 17 is a device operated and stopped by an ON/OFF signal from the control unit 42, and dries the separator workpiece 20 for example by fanning or by radiating heat at the separator workpiece 20.

The carrying apparatus 21 is disposed above the process tanks 11 . . . and the dryer 17 and is made up of a first drum 44 driven by a first electric motor 43, a second drum 46 driven by a second electric motor 45, a cable 47 running between the first drum 44 and the second drum 46, a separator carrying part 48 attached to this cable 47, and a weight sensor 49 serving as weighing means for measuring the weight of the separator workpiece 20.

To carry the separator workpiece 20, the first electric motor 43 and the second electric motor 45 are rotated synchronously by the control unit 42 to rotate the first drum 44 and the second drum 46 and move the separator carrying part 48, from which the separator workpiece 20 is suspended.

Figure 2:
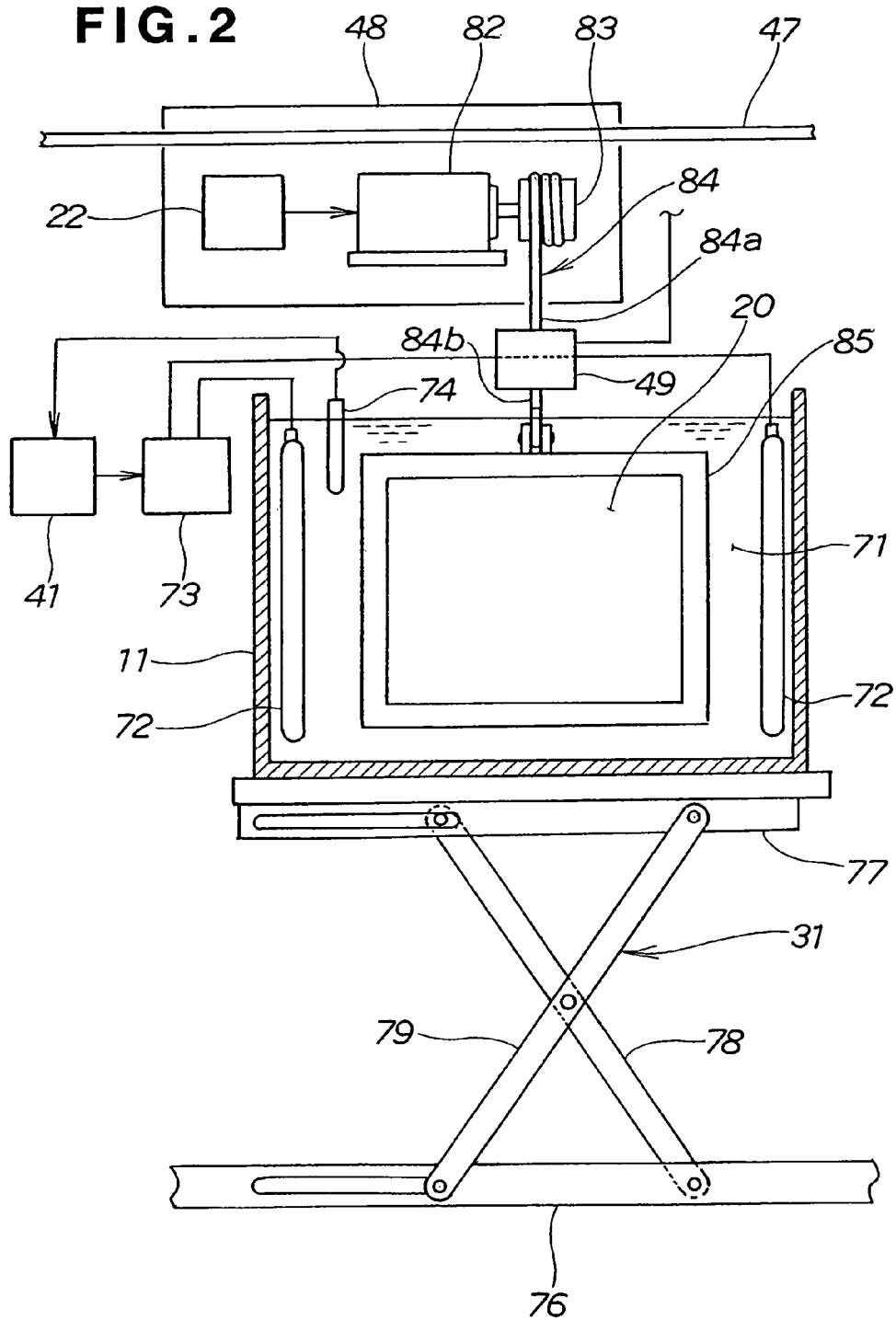
FIG. 2 is a side elevational view illustrating a separator treatment state of the first embodiment of the invention.

In FIG. 2 a state is shown wherein with respect to a separator workpiece 20 for example a lifter 31 provided below a process tank 11 is driven to raise the process tank 11 and immerse the separator workpiece 20 in the process liquid 71 contained in the process tank 11. 72, 72 are heaters disposed inside the process tank 11; 73 is a power supply for the heaters 72, 72; and 74 is a temperature sensor for detecting the temperature of the process liquid 71, and by a temperature signal being sent from this temperature sensor 74 to the liquid temperature control device 41, the liquid temperature control device 41 controls a current passing through the heaters 72, 72 from the power supply 73 and adjusts the temperature of the process liquid 71 to a predetermined temperature.

The lifter 31 is a pantograph type raising and lowering device made up of a base part 76, first bars 78, 78 (the back side first bar 78 is not shown in the figure) each having one end swingably attached to this base part 76 and the other end slidably attached to a process tank bearing part 77 provided below the first process tank 11, second bars 79, 79 (the back side second bar 79 is not shown in the figure) each having one end slidably attached to the base part 76 and the other end swingably attached to the process tank bearing part 77, and a cylinder device (not shown) for driving the first bars 78, 78 or the second bars 79, 79.

An electric motor 82 provided inside the separator carrying part 48 has a drum 83 on its output shaft and takes in a wire 84 onto this drum 83, and a frame-shaped member 85 is removably attached to the end of this wire 84 and the separator workpiece 20 is held by this frame-shaped member 85.

For example, if forward and reverse rotation of the output shaft of the electric motor 82 are repeated with a separator workpiece 20 immersed in the process liquid 71, the drum 83 forward and reverse rotates and the wire 84 moves up and down and the separator workpiece 20 moves up and down along with the frame-shaped member 85, and an effect substantially the same as agitating the process liquid 71 is obtained.

As a result, the treatment of the separator workpiece 20 with the process liquid 71 can be quickened.

The speed of the electric motor 82 is controlled by the control unit 42 by way of the driving device 22. By this means, the speed of the up and down movement of the separator workpiece 20 can be changed. The speed of the up and down movement in this case is an "agitation speed" which will be discussed later.

The wire 84 is divided into an upper wire 84a and a lower wire 84b and the weight sensor 49 is interposed between the upper wire 84a and the lower wire 84b, and to check the weight of the separator workpiece 20 the total weight Wt of the lower wire 84b, the frame-shaped member 85 and the separator workpiece 20 is measured with the weight sensor 49 and by this weight signal being sent to the control unit 42 (see FIG. 1) the weight Ws of the separator workpiece 20 is calculated by the weight Ww of the lower wire 84b and the weight Wf of the frame-shaped member 85 being subtracted from the total weight Wt by the control unit 42. That is, Ws=Wt−(Ww+Wf).

Figure 3:
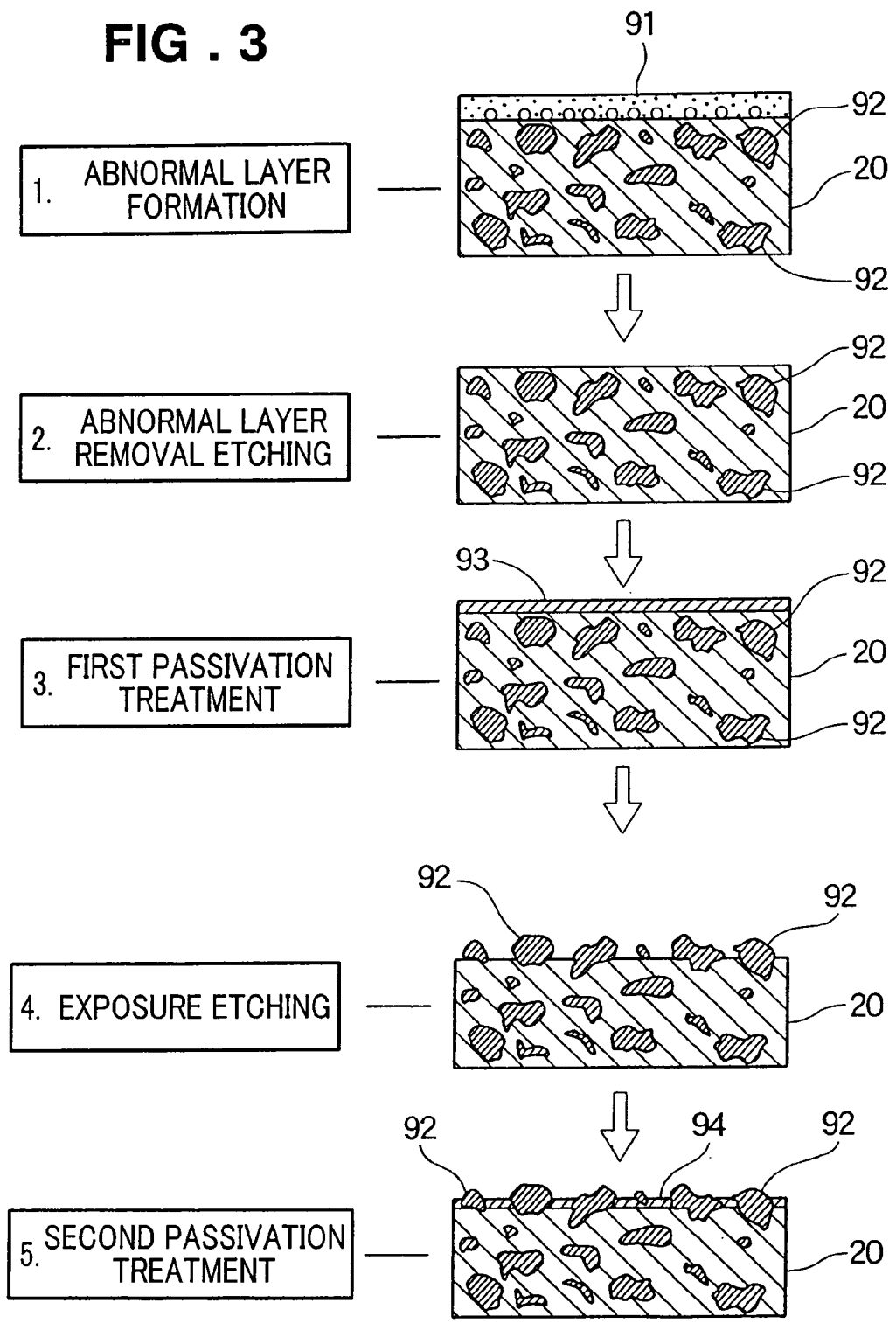
FIG. 3 is a schematic view illustrating main processes in the separator manufacturing method of the first embodiment of the invention.

The main treatments in the production process of a separator are illustrated in order in FIG. 3.

1. Abnormal Layer Removal

A separator workpiece 20 is rolled before being press-formed to a predetermined shape.

When the separator workpiece 20 is rolled, an abnormal layer 91 is formed at the surface of the separator workpiece 20. The abnormal layer 91 is a layer where, due to the rolling, particulate materials (intermetallic compounds and so on) which had been included in the separator workpiece 20 are broken up and their particle size has become smaller, and as a result of oxides and the like being included the conductivity has fallen, which raises the electrical contact resistance when the separator is stacked and becomes a factor reducing the output of the fuel cell. 92 . . . denotes particulate conductors, which are good conductors included in the separator workpiece 20, and include for example Cr$_2$B, which is an intermetallic compound. The shapes of the conductors 92 differ, but for convenience the same reference number has been used.

2. Abnormal Layer Removal Etching

The abnormal layer 91 described above is removed by etching. After that, the separator workpiece 20 is weighed, and the removed weight of abnormal layer 91 is obtained.

3. First Passivation Treatment

To prevent corrosion of the separator workpiece 20 a first passivation treatment is carried out, and a first passivation film 93 is formed.

4. Exposure Etching

Etching is carried out to remove a surface layer of the separator workpiece 20 so that the conductors 92 project (are exposed) from the surface of the separator workpiece 20. The weight of the separator workpiece 20 removed at this time will be called the exposure weight. After that, the separator workpiece 20 is weighed to obtain the exposure weight.

5. Second Passivation Treatment

After the exposure of the conductors 92 a second passivation treatment is carried out to prevent corrosion of the separator workpiece 20, and a second passivation film 94 is formed.

This completes the manufacture of the separator.

Figure 4:
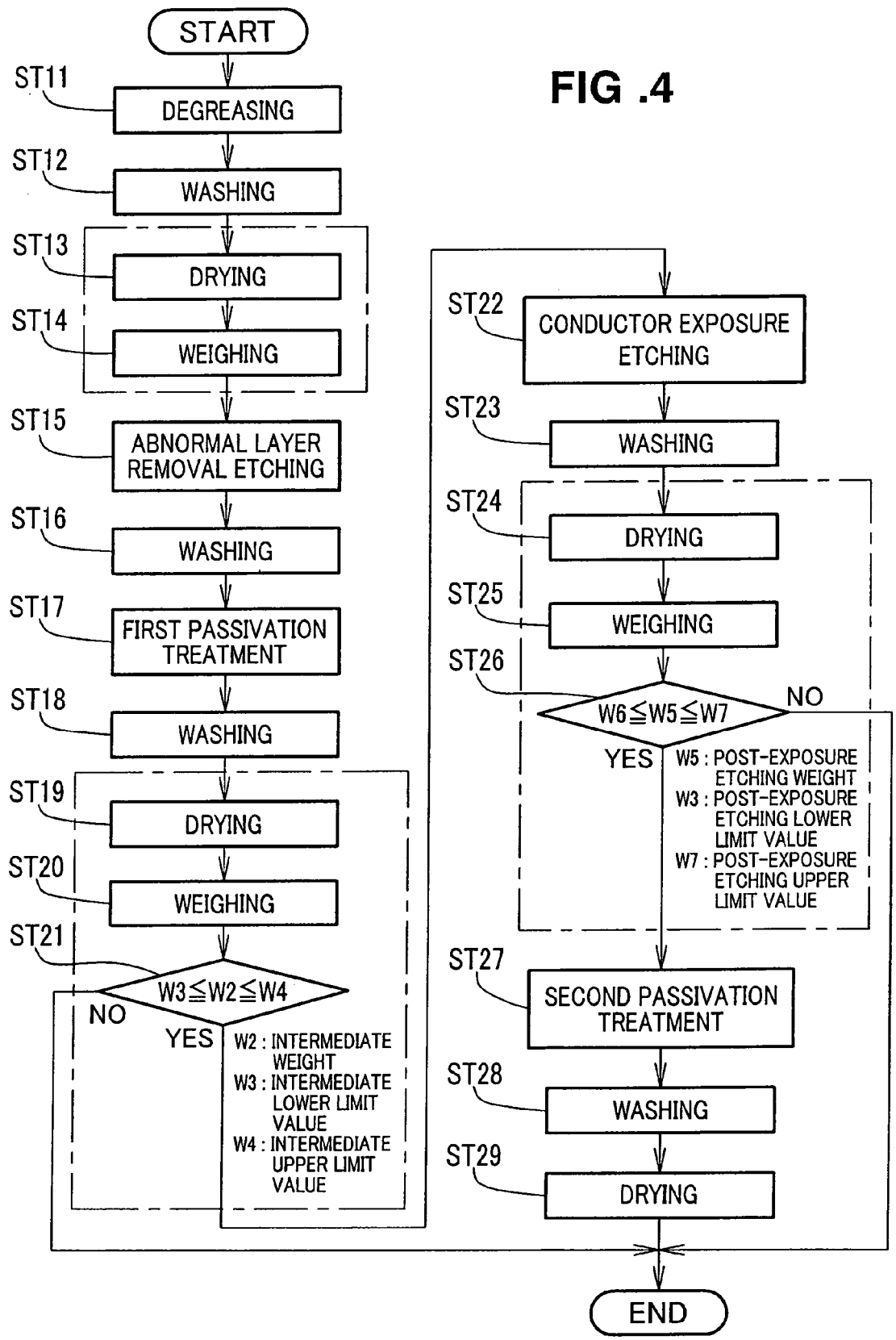
FIG. 4 is a flowchart illustrating the separator manufacturing method of the first embodiment of the invention.

In FIG. 4, the process including the main treatments described with reference to FIG. 3 is illustrated. STXX indicates a step number. The parts surrounded by broken lines in the figure are steps related to weight measurement.

ST11 A rolled and then press-formed separator workpiece is degreased.

ST12 The separator workpiece is washed.

ST13 The separator workpiece is dried.

ST14 The weight of the separator workpiece is measured. The weight here will be called the initial weight W1.

ST15 The abnormal layer that had been formed at the time of rolling is removed by etching.

ST16 The separator workpiece is washed.

ST17 The first passivation treatment is carried out to prevent corrosion of the separator workpiece.

ST18 The separator workpiece is washed.

ST19 The separator workpiece is dried.

ST20 The weight of the separator workpiece is measured. If the weight here is written intermediate weight W2, and the weight of abnormal layer removed is written dw1, then W2=W1−dw1.

ST21 It is determined whether or not the intermediate weight W2 of the separator workpiece (20) is within a predetermined range, i.e. whether or not the intermediate weight W2 is in the range between an intermediate lower limit value W3 and an intermediate upper limit value W4 (whether W3≦W2≦W4).

Before the determination, the relationship between the initial weight W1, the intermediate lower limit value W3, the intermediate upper limit value W4 and the weight of abnormal layer removed dw1 mentioned above will be explained below.

When W3≦W2≦W4, because W2=W1−dw1, W3≦(W1−dw1)≦W4. From this, (W1−W4)≦dw1≦(W1−W3). This is the range in which the weight of abnormal layer removed dw1 should lie.

In ST21, when the intermediate weight W2 of the separator workpiece does not satisfy W3≦W2≦W4 (NO), processing is ended. That is, this separator workpiece is removed from the separator production process.

When the intermediate weight W2 of the separator workpiece satisfies W3≦W2≦W4 (YES), processing proceeds to ST22.

ST22 Etching to expose the conductors in the separator workpiece is carried out.

ST23 The separator workpiece is washed.

ST24 The separator workpiece is dried.

ST25 The weight of the separator workpiece is measured. When the weight here is called the post-exposure etching weight W5 and the exposure weight is written dw2, then W5=W2−dw2.

ST26 It is determined whether or not the post-exposure etching weight W5 of the separator workpiece is within a predetermined range, i.e. whether or not the post-exposure etching weight W5 is in the range between a post-exposure etching lower limit value W6 and a post-exposure etching upper limit value W7 (whether or not W6≦W5≦W7).

Before the determination, the relationship between the intermediate weight W2, the post-exposure etching lower limit value W6, the post-exposure etching upper limit value W7 and the exposure weight dw2 mentioned above will be described below.

When W6≦W5≦W7 is obtained, because W5=W2−dw2, W6≦(W2−dw2)≦W7. From this, (W2−W7)≦dw2≦(W2−W6). This is the range in which the exposure weight dw2 should lie.

In ST26, when the post-exposure etching weight W5 of the separator workpiece does not satisfy $W6 \leq W5 \leq W7$ (NO), processing is ended. That is, this separator workpiece is removed from the separator production process.

When the post-exposure etching weight W5 of the separator workpiece satisfies $W6 \leq W5 \leq W7$, processing proceeds to ST27.

ST27 The second passivation treatment is carried out, to prevent corrosion of the separator workpiece.

ST28 The separator workpiece is washed.

ST29 The separator workpiece is dried.

This completes the manufacture of the separator.

Figure 5:
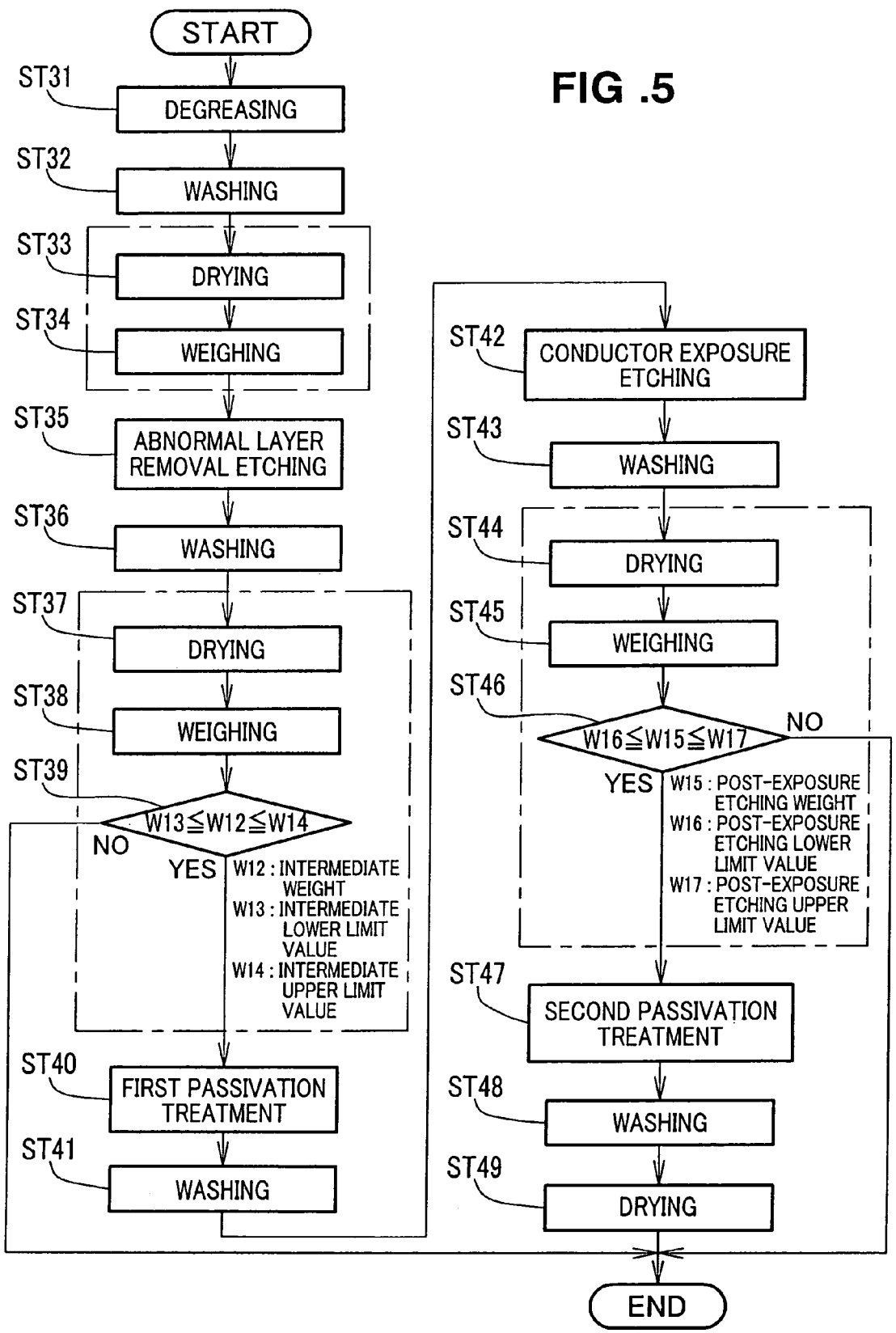
FIG. 5 is a flowchart illustrating a variation of the separator manufacturing method of the first embodiment of the invention.

The embodiment of a separator production process shown in FIG. 5 differs from the metal separator production process shown in FIG. 4 in the time at which the intermediate weight is measured.

ST31 A rolled and then press-formed separator workpiece is degreased.

ST32 The separator workpiece is washed.

ST33 The separator workpiece is dried.

ST34 The weight of the separator workpiece is measured. The weight here will be called the initial weight W11.

ST35 The abnormal layer that had been formed at the time of rolling is removed by etching.

ST36 The separator workpiece is washed.

ST37 The separator workpiece is dried.

ST38 The weight of the separator workpiece is measured. When the weight here is written intermediate weight W12 and the weight of abnormal layer removed is written dw11, then $W12=W11-dw11$.

ST39 It is determined whether or not the intermediate weight W12 of the separator workpiece is within a predetermined range, i.e. whether or not the intermediate weight W12 is within the range between an intermediate lower limit value W13 and an intermediate upper limit value W14 (whether or not $W13 \leq W12 \leq W14$).

Before the determination, the relationship between the initial weight W11, the intermediate lower limit value W13, the intermediate upper limit value W14 and the weight of abnormal layer removed dw11 mentioned above will be explained below.

When $W13 \leq W12 \leq W14$ is obtained, because $W12=W11-dw11$, $W13 \leq (W11-dw11) \leq W14$. From this, $(W11-W14) \leq dw11 \leq (W11-W13)$. This is the range in which the weight of abnormal layer removed dw11 should lie.

In ST39, when the intermediate weight W12 of the separator workpiece does not satisfy $W13 \leq W12 \leq W14$ (NO), processing is ended. That is, this separator workpiece is removed from the separator production process.

When the intermediate weight W12 of the separator workpiece does satisfy $W13 \leq W12 \leq W14$ (YES), processing proceeds to ST40.

ST40 The first passivation treatment is carried out, to prevent corrosion of the separator workpiece.

ST41 The separator workpiece is washed.

ST42 Etching is carried out to expose the conductors in the separator workpiece.

ST43 The separator workpiece is washed.

ST44 The separator workpiece is dried.

ST45 The weight of the separator workpiece is measured. When the weight here is written post-etching weight W15 and the exposure weight is written dw12, then $W15=W12-dw12$.

ST46 It is determined whether or not the post-exposure etching weight W15 of the separator workpiece is within a predetermined range, i.e. whether or not the post-exposure etching weight W15 is in the range between a post-exposure etching lower limit value W16 and a post-exposure etching upper limit value W17 (whether or not $W16 \leq W15 \leq W17$).

Before the determination, the relationship between the intermediate weight W12, the post-exposure etching lower limit value W16, the post-exposure etching upper limit value W17 and the exposure weight dw12 mentioned above will be described below.

When $W16 \leq W15 \leq W17$ is obtained, because $w15=W12-dw12$, $W16 \leq (W12-dw12) \leq W17$. From this, $(W12-W17) \leq dw12 \leq (W12-W16)$. This is the range in which the exposure weight dw12 should lie.

In ST46, when the exposure etching weight W15 does not satisfy $W16 \leq W15 \leq W17$ (NO), processing is ended. That is, this separator workpiece is removed from the separator production process.

When the etching weight W15 of the separator workpiece does satisfy $W16 \leq W15 \leq W17$ (YES), processing proceeds to ST47.

ST47 The second passivation treatment is carried out to prevent corrosion of the separator workpiece.

ST48 The separator workpiece is washed.

ST49 The separator workpiece is dried.

This completes the manufacture of the separator.

Figure 6:
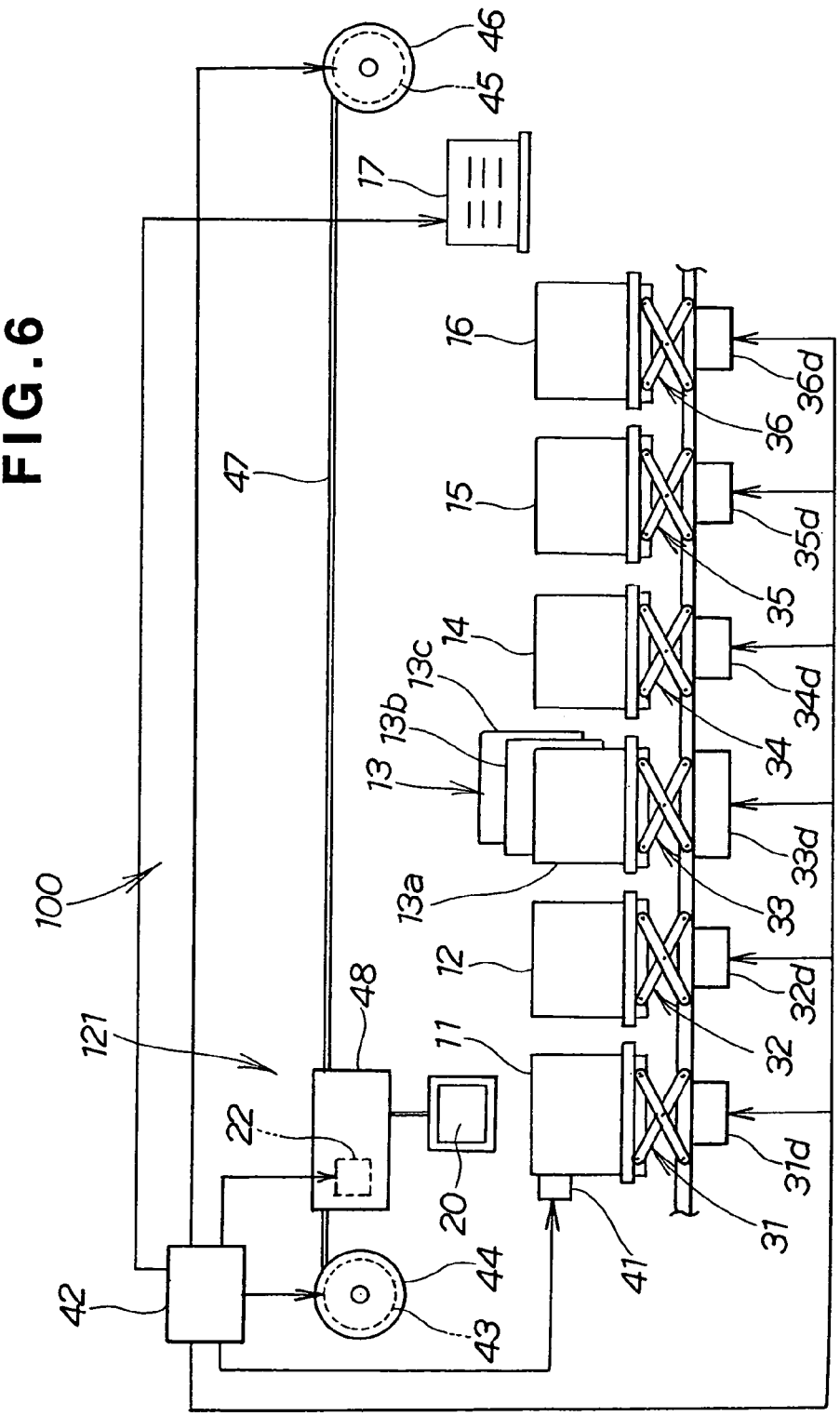
FIG. 6 is a schematic view illustrating a fuel cell separator manufacturing apparatus according to a second embodiment of the invention.

As shown in FIG. 6, a separator manufacturing apparatus 100 is made up of a first process tank 11 (the process tank 11 mentioned above will from now on be referred to as the first process tank 11) and a second process tank 12 through a sixth process tank 16 holding process liquids for carrying out treatments relating to separator production which will be further discussed later, a dryer 17, a carrying apparatus 121 for carrying a separator workpiece 20 to become a separator to the positions of the first process tank 11 through the sixth process tank 16 and the dryer 17, a driving device 22 for driving an electric motor for raising and lowering a separator workpiece 20 carried by this carrying apparatus 121, a first lifter 31 (the lifter 31 mentioned above will from now on be referred to as the first lifter 31) and a second lifter 32 through a sixth lifter 36 for raising and lowering the first process tank 11 through the sixth process tank 16 respectively to immerse the separator workpiece 20 in the process liquids of the first process tank 11 through the sixth process tank 16, the liquid temperature control devices 41 . . . (although the first process tank 11 through the sixth process tank 16 are each provided with one of these liquid temperature control devices 41, in the figure one is drawn only on the first process tank 11) for controlling the temperatures of the process liquids in the first process tank 11 through the sixth process tank 16, and a control unit 42 for controlling the dryer 17, the carrying apparatus 121, the driving device 22, the first lifter 31 through the sixth lifter 36, and the liquid temperature control devices 41. 31$d$ through 36$d$ are lifter drivers for driving the respective first lifter 31 through sixth lifter 36. The second lifter 32 through the sixth lifter 36 and the lifter drivers 32$d$ through 36$d$ are of the same construction as the first lifter 31 and the lifter driver 31$d$.

The above-mentioned first process tank 11 is a degreasing tank, the second process tank 12, the fourth process tank 14 and the sixth process tank 16 are washing tanks, the third process tank 13 is an etching tank, and the fifth process tank 15 is a passivation process tank.

The third process tank 13 is made up of three tanks lined up in the front-rear direction of the paper, namely an A-tank 13$a$, a B-tank 13$b$ and a C-tank 13$c$, and the third lifter 33 also is made up of an A-lifter, a B-lifter and a C-lifter, not shown in the figure, corresponding to the A-tank 13$a$, the B-tank 13$b$ and the C-tank 13$c$.

The carrying apparatus 121 is made up of a first drum 44, a second drum 46, a cable 47 and a separator carrying part 48.

The third lifter 33 also has a horizontal moving mechanism (not shown) for moving the A-tank 13a, the B-tank 13b and the C-tank 13c integrally in the front-rear direction of the paper, and by the A-tank 13a, the B-tank 13b or the C-tank 13c being moved to directly below the separator workpiece 20 and lifted, the separator workpiece 20 can be selectively immersed in the A-tank 13a, the B-tank 13b or the C-tank 13c.

Figure 7:
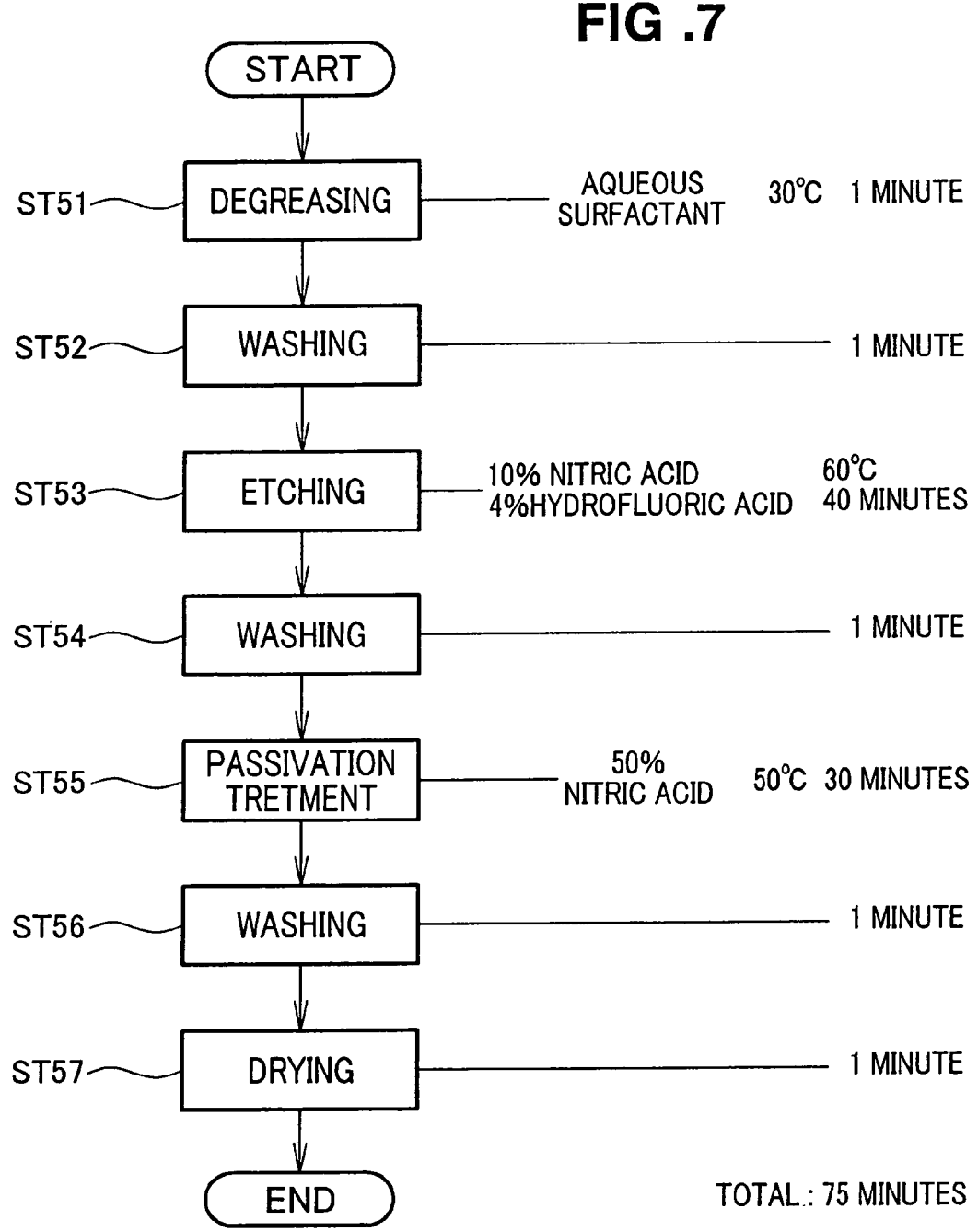
FIG. 7 is a flowchart illustrating a separator manufacturing method according to the second embodiment of the invention.

In FIG. 7, a separator manufacturing method of a second embodiment is illustrated.

ST51 A separator workpiece is degreased. The process liquid is an aqueous surfactant solution, the temperature of the process liquid is 30° C., and the treatment time is 1 minute.

ST52 The separator workpiece is washed. The treatment time is 1 minute.

ST53 An etching is carried out to remove the abnormal layer formed on the separator workpiece and to expose the conductors included in the surface layer of the separator workpiece. The process liquid is a solution of 10% nitric acid and 4% hydrofluoric acid, the process liquid temperature is 60° C. and the treatment time is 40 minutes.

ST54 The separator workpiece is washed. The time required is 1 minute.

ST55 A passivation treatment is carried out on the surface of the separator workpiece, and a passivation film is formed. The process liquid is 50% nitric acid, the process liquid temperature is 50° C. and the treatment time is 30 minutes.

ST56 The separator workpiece is washed. The treatment time is 1 minute.

ST57 The separator workpiece is dried. The time required is 1 minute.

Figure 22:
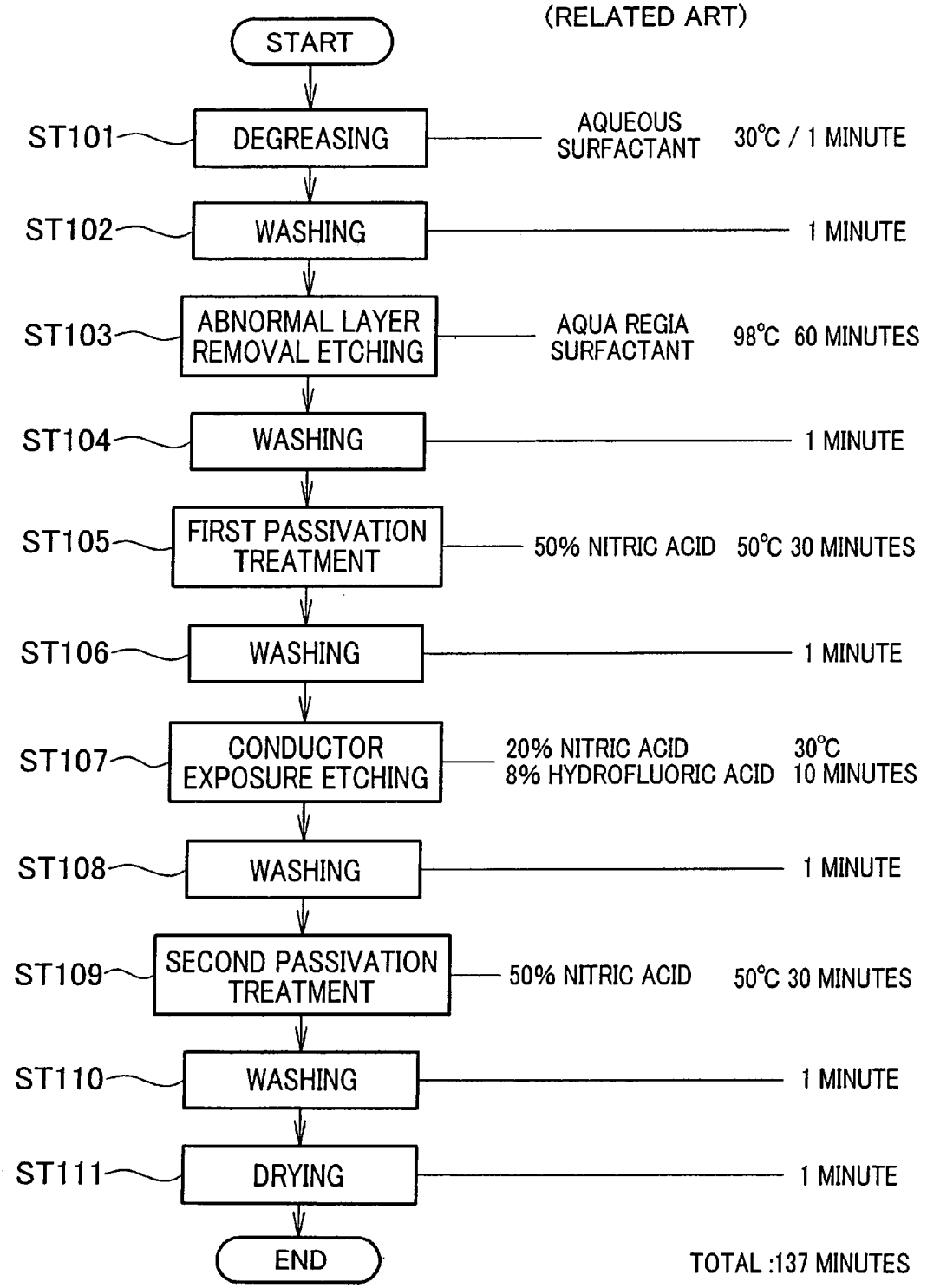
FIG. 22 is a flowchart illustrating a metal separator manufacturing process of related art.
Figure 23:
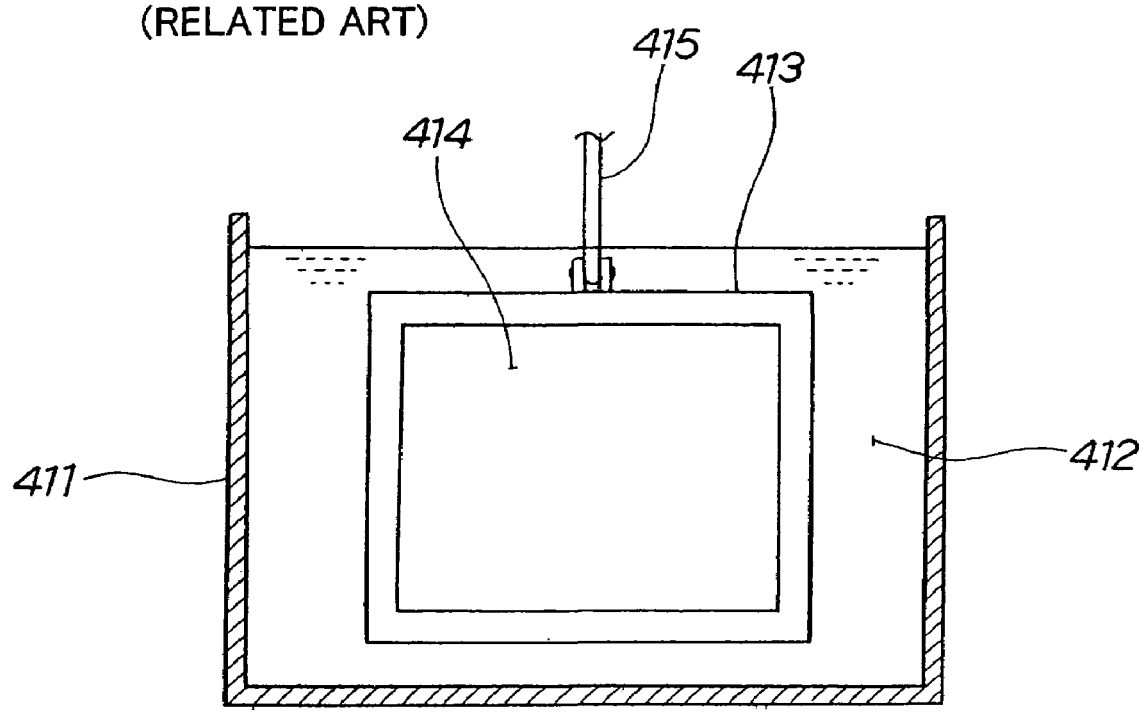
FIG. 23 is a side elevational view illustrating treatment of a surface in the manufacture of a metal separator in the art.

This completes the manufacture of the separator. The time required for the above production is 75 minutes in total, and is 62 minutes shorter than the total of 137 minutes required for the related art described with reference to FIG. 22.

The process steps described above are carried out with the separator workpiece being moved to the positions of the respective process tanks and the dryer.

That is, the degreasing of ST51 is carried out in the position of the first process tank, the washing of ST52 in that of the second process tank, the etching of ST53 in that of the third process tank, the washing of ST54 in that of the fourth process tank, the passivation treatment of ST55 in that of the fifth process tank, the washing of ST56 in that of the sixth process tank, and the drying of ST57 in that of the dryer.

With reference to FIG. 8A through FIG. 8C, the removal of the abnormal layer from the separator workpiece (ST53), the exposure of conductors (ST53) and the passivation treatment (ST55) will now be explained in detail.

FIG. 8A shows an abnormal layer 91 formed on a separator workpiece 20.

To remove this abnormal layer 91, first, etching is carried out (see ST53 of FIG. 7). As a result of this, as shown in FIG. 8B, as well as the abnormal layer 91 disappearing, a surface layer of the separator workpiece 20 itself is removed, and the conductors 92 . . . are caused to project; that is, exposing of the conductors 92 . . . is effected.

Then, to prevent corrosion of the surface of the separator workpiece 20 itself, other than the conductors 92 . . . , a passivation treatment (see ST55 of FIG. 7) is carried out, and as shown in FIG. 8C a passivation film 95 is formed on the surface of the separator workpiece 20 itself. At this time, the passivation film 95 is not formed on the surfaces of the conductors 92 . . . , and because the conductors 92 . . . have a large surface area and project from the passivation film 95, when the separator is stacked, the contact resistance between adjacent separators and between separators and electrodes can be made low.

With reference to FIG. 9A through FIG. 9D, the removal of the abnormal layer and the exposing of the conductors described with reference to FIG. 8A through FIG. 8C will now be explained in further detail.

FIG. 9A is an enlarged sectional view of a main part of a separator workpiece with an abnormal layer 91 formed on the separator workpiece 20.

The thickness of the abnormal layer 91 varies with the state of the rolling. For example, there is the case where the thickness of the abnormal layer 91 is T1, the case where the thickness is T2, and the case where the thickness is T3. In the range [1] where the thickness is T1 to T2, if the surface is examined with a metal microscope, it appears as shown in FIG. 9B. That is, the conductors 92 cannot be observed.

And in the range [2] where the thickness of the abnormal layer 91 is T2 to T3, if the surface is examined with a metal microscope, it appears as shown in FIG. 9C. That is, there are from conductors 92 which can only just be seen to conductors 92 which can be observed at a particle size of up to 2 μm.

Also, in the range [3] where the thickness of the abnormal layer 91 is less than T3 and greater than T=0, when the surface is examined with a metal microscope, it appears as shown in FIG. 9D. That is, the particle diameters of the conductors 92 exceed 2 μm and can be observed at sizes of up to 20 μm.

In practice, the above-mentioned thickness T1 is about 5 μm, the thickness T2 is about 21 μm and the thickness T3 is about 0.5 μm.

In this invention, the conditions of the etching for removing the abnormal layer 91 and exposing the conductors 92, namely the constituents of the process liquid, the process liquid temperature, the agitation method (speed etc.) and the treatment time, are changed according to the thickness of the abnormal layer 91.

Specifically, according to the thickness of the abnormal layer 91 described above, one tank is selected from among the A-tank 13a, the B-tank 13b and the C-tank 13c of the third process tank 13 shown in FIG. 6 and the separator is immersed in this and processed under treatment conditions corresponding to that tank.

A first practicing mode of these etching conditions will now be described, with reference to the columns of Mode 1 of the following table.

| Mode | Conditions | Solution Composition | | Solution Temp. ° C. | Agitation m/min | Treatment Time min |
|---|---|---|---|---|---|---|
| 1 | Embodiment A1 | 10% nitric acid | 8% hydrofluoric acid | 70 | 10 | 60 |
|   | Embodiment B1 | 20% nitric acid | 4% hydrofluoric acid | 50 | 5 | 30 |
|   | Embodiment C1 | 30% nitric acid | 2% hydrofluoric acid | 30 | 0.6 | 10 |
| 2 | Embodiment A2 | 10% nitric acid | 8% hydrofluoric acid | 70 | 5 | 30 |
|   | Embodiment B2 | 20% nitric acid | 4% hydrofluoric acid | 50 | 5 | 30 |
|   | Embodiment C2 | 30% nitric acid | 2% hydrofluoric acid | 30 | 5 | 30 |
| 3 | Embodiment A3 | 10% nitric acid | 4% hydrofluoric acid | 60 | 10 | 40 |
|   | Embodiment B3 | 10% nitric acid | 4% hydrofluoric acid | 60 | 5 | 20 |
|   | Embodiment C3 | 10% nitric acid | 4% hydrofluoric acid | 60 | 1 | 5 |
| 4 | Embodiment A4 | 10% nitric acid | 8% hydrofluoric acid | 60 | 10 | 40 |
|   | Embodiment B4 | 10% nitric acid | 4% hydrofluoric acid | 60 | 5 | 20 |
|   | Embodiment C4 | 10% nitric acid | 2% hydrofluoric acid | 60 | 1 | 5 |

Mode 1:

Embodiment A1: The solution composition, i.e. the constituents of the process liquid, is a solution of 10% nitric acid and 8% hydrofluoric acid; the solution temperature, i.e. the temperature of the process liquid, is 70° C.; the agitation speed of the process liquid is 10 m/min; and the treatment time is 60 min.

Embodiment B1: The solution composition is a solution of 20% nitric acid and 4% hydrofluoric acid; the solution temperature is 50° C.; the agitation speed is 5 m/min; and the treatment time is 30 min.

Embodiment C1: The solution composition is a solution of 30% nitric acid and 2% hydrofluoric acid; the solution temperature is 30° C.; the agitation speed is 0.6 m/min; and the treatment time is 10 min.

Embodiment A1 is the etching conditions of the A-tank 13a, Embodiment B1 those of the B-tank 13b, and Embodiment C1 those of the C-tank 13c.

This Mode 1 has etching conditions wherein the greater the thickness of the abnormal layer, as shown above, the smaller the nitric acid concentration and the larger the hydrofluoric acid concentration, the higher the solution temperature, the higher the agitation speeds, and the longer the treatment time.

Next, a second practicing mode will be described, with reference to the columns of Mode 2 of the foregoing table.

Mode 2:

Embodiment A2: The solution composition is a solution of 10% nitric acid and 8% hydrofluoric acid; the solution temperature is 70° C.; the agitation speed is 5 m/min; and the treatment time is 30 min.

Embodiment B2: The solution composition is a solution of 20% nitric acid and 4% hydrofluoric acid; the solution temperature is 50° C.; the agitation speed is 5 m/min; and the treatment time is 30 min.

Embodiment C2: The solution composition is a solution of 30% nitric acid and 2% hydrofluoric acid; the solution temperature is 30° C.; the agitation speed is 5 m/min; and the treatment time is 30 min.

Embodiment A2 is the etching conditions of the A-tank 13a, Embodiment B2 those of the B-tank 13b, and Embodiment C2 those of the C-tank 13c.

This Mode 2 has etching conditions wherein the greater the thickness of the abnormal layer, as shown above, the smaller the nitric acid concentration and the larger the hydrofluoric acid concentration, and the higher the solution temperature.

Next, a third practicing mode will be described, with reference to the columns of Mode 3 of the foregoing table.

Mode 3:

Embodiment A3: The solution composition is a solution of 10% nitric acid and 4% hydrofluoric acid; the solution temperature is 60° C.; the agitation speed is 10 m/min; and the treatment time is 40 min.

Embodiment B3: The solution composition is a solution of 10% nitric acid and 4% hydrofluoric acid; the solution temperature is 60° C.; the agitation speed is 5 m/min; and the treatment time is 20 min.

Embodiment C3: The solution composition is a solution of 10% nitric acid and 4% hydrofluoric acid; the solution temperature is 60° C.; the agitation speed is 1 m/min; and the treatment time is 5 min.

Embodiment A3 is the etching conditions of the A-tank 13a, Embodiment B3 those of the B-tank 13b, and Embodiment C3 those of the C-tank 13c.

This Mode 3 has etching conditions wherein the greater the thickness of the abnormal layer, as shown above, the higher the process liquid agitation speed and the longer the treatment time.

Next, a fourth practicing mode will be described, with reference to the columns of Mode 4 of the foregoing table.

Mode 4:

Embodiment A4: The solution composition is a solution of 10% nitric acid and 8% hydrofluoric acid; the solution temperature is 60° C.; the agitation speed is 10 m/min; and the treatment time is 40 min.

Embodiment B4: The solution composition is a solution of 10% nitric acid and 4% hydrofluoric acid; the solution temperature is 60° C.; the agitation speed is 5 m/min; and the treatment time is 20 min.

Embodiment C4: The solution composition is a solution of 10% nitric acid and 2% hydrofluoric acid; the solution temperature is 60° C.; the agitation speed is 1 m/min; and the treatment time is 5 min.

Embodiment A4 is the etching conditions of the A-tank 13a, Embodiment B4 those of the B-tank 13b, and Embodiment C4 those of the C-tank 13c.

This Mode 4 has etching conditions wherein the greater the thickness of the abnormal layer, as shown above, the greater the hydrofluoric acid concentration, the higher the agitation speed, and the longer the treatment time.

Figure 10:
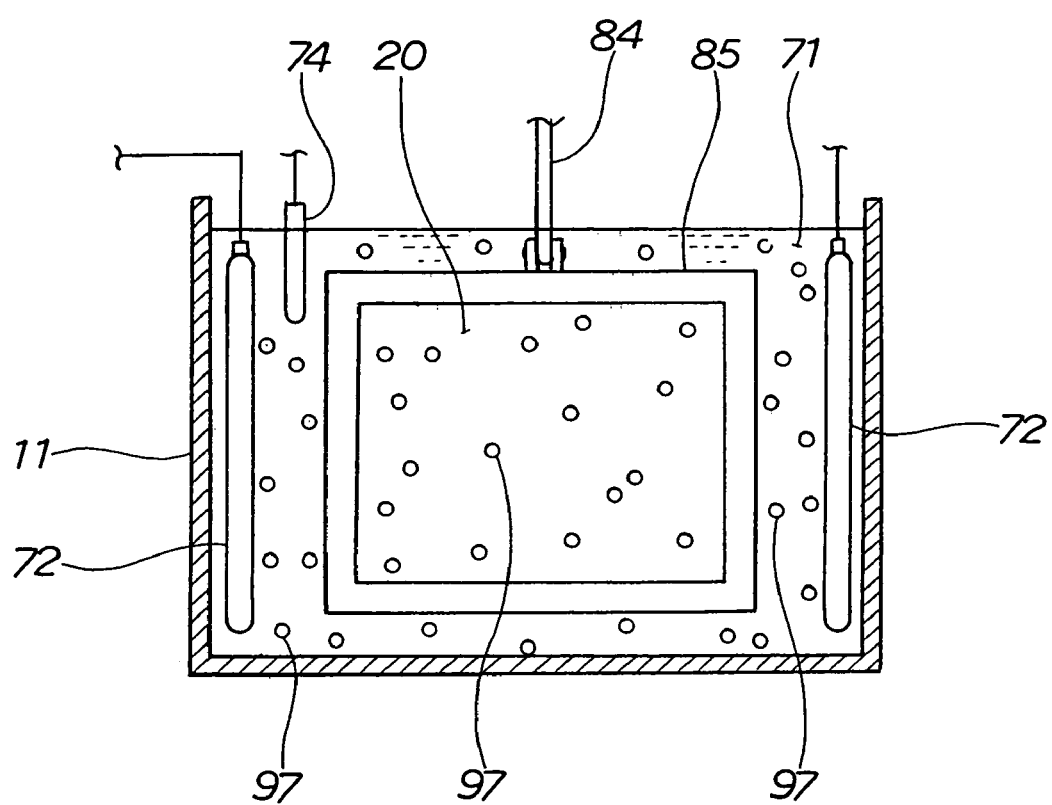
FIG. 10 is an operation view illustrating a variation of etching conditions of the second embodiment of the invention.

As shown in FIG. 10, a granular agitating material 97 . . . which promotes etching, for example silicon carbonate (SiC), is mixed with the process liquid 71 of the separator workpiece 20.

When in this state the separator workpiece 20 is moved up and down, the grains of agitating material 97 . . . hit the surface of the separator workpiece 20 and perform the role of a polisher, whereby it is possible to quicken the removal of the abnormal layer of the separator workpiece 20 and the exposing of the conductors.

Figure 11:
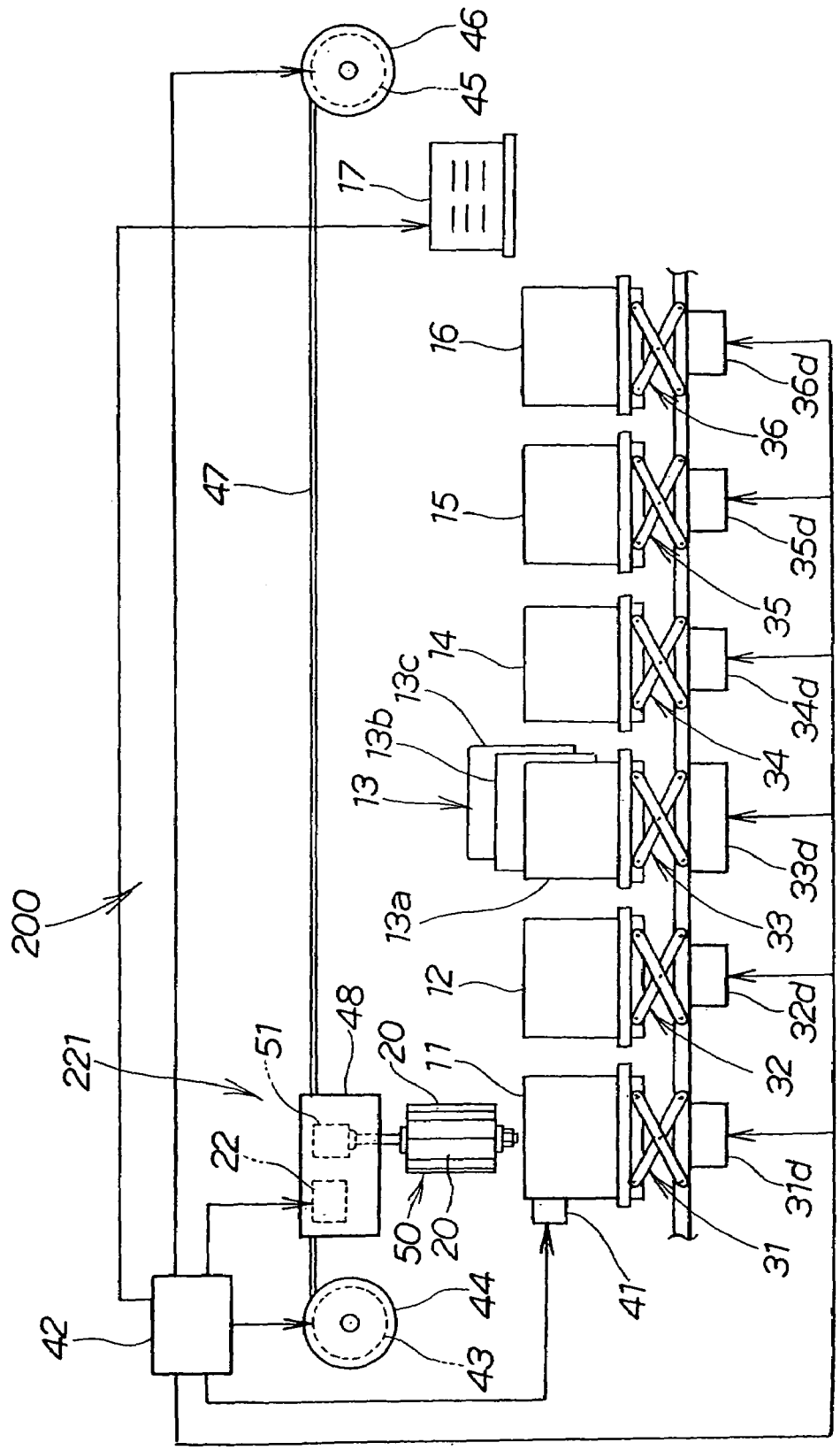
FIG. 11 is a schematic view illustrating a fuel cell separator manufacturing apparatus according to a third embodiment of the invention.

A separator manufacturing apparatus 200 of a third embodiment shown in FIG. 11 is made up of a first process tank 11 through a sixth process tank 16 and a dryer 17, a carrying apparatus 221 serving as carrying means for carrying a plurality of separator workpieces 20 . . . to the positions of the first process tank 11 through the sixth process tank 16 and the dryer 17, a driving part 22 for driving an electric motor for raising and lowering the separator workpieces 20 moved by this carrying apparatus 221, a first lifter 31 through a sixth lifter 36, liquid temperature control devices 41 . . . , and a control unit 42 for controlling the carrying apparatus 221.

The carrying apparatus 221 is made up of a first drum 44, a second drum 46, a cable 47, a separator carrying part 48, and a cylindrical holding jig 50 for holding the separator workpieces 20.

Figure 12:
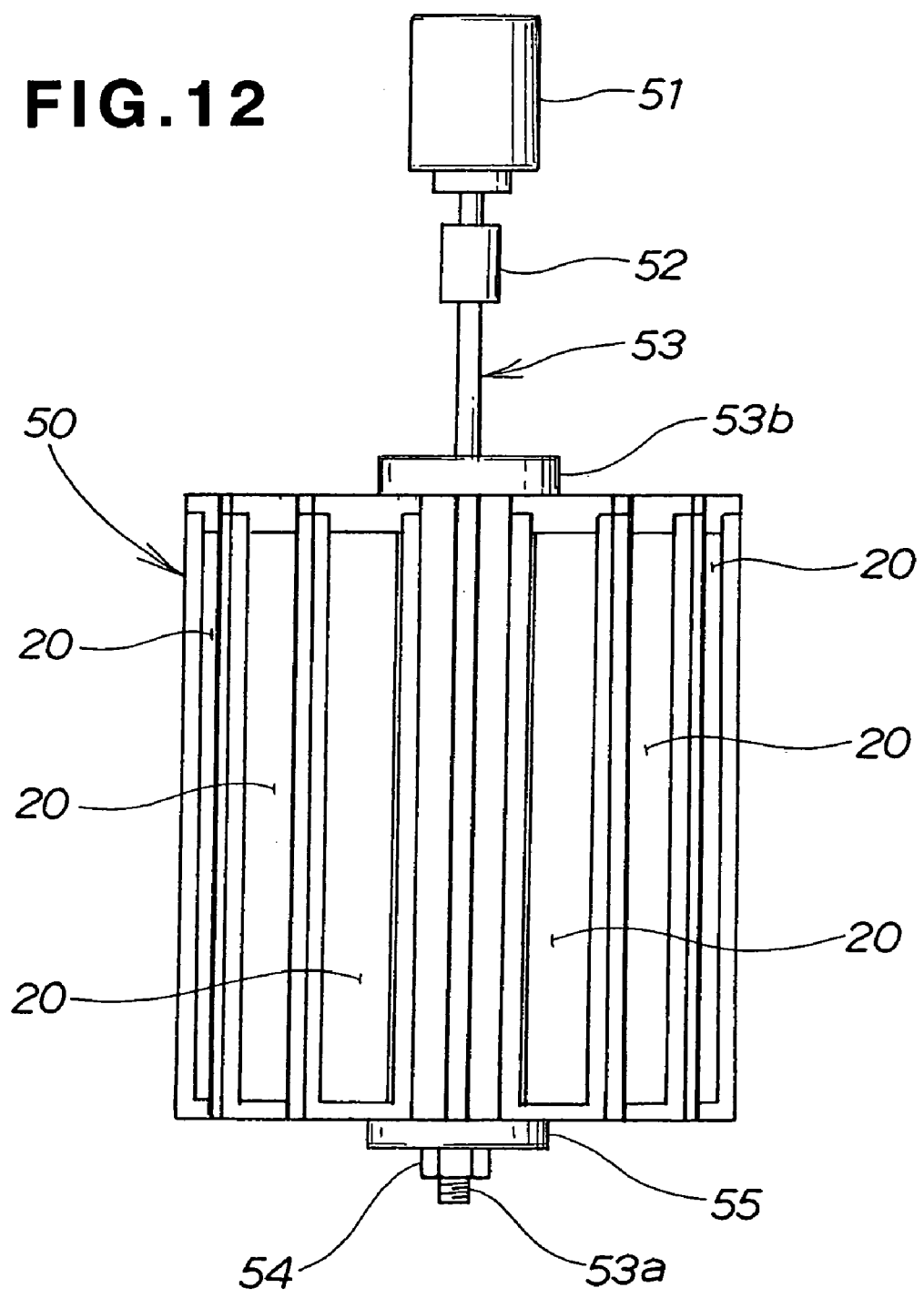
FIG. 12 is a side view of a cylindrical holding jig according to the third embodiment of the invention.

As shown in FIG. 12, the cylindrical holding jig 50 is a member mounted by attaching a shaft 53 to the output shaft of an electric motor 51 by way of a joint 52 and screwing a nut 54 onto a male thread 53a provided on this shaft 53, and the separator workpieces 20 . . . are held on the circumferential face of the cylindrical holding jig 50. 53b is a flange formed integrally with the shaft 53, and 55 is a washer.

The cylindrical holding jig 50, the joint 52, the shaft 53 and the nut 54 are members made of a material which does not react with the process liquids, or are members surface-treated so that they do not react with the process liquids.

The structure which holds the separator workpiece 20 will be explained with reference to the next figure.

Figure 13:
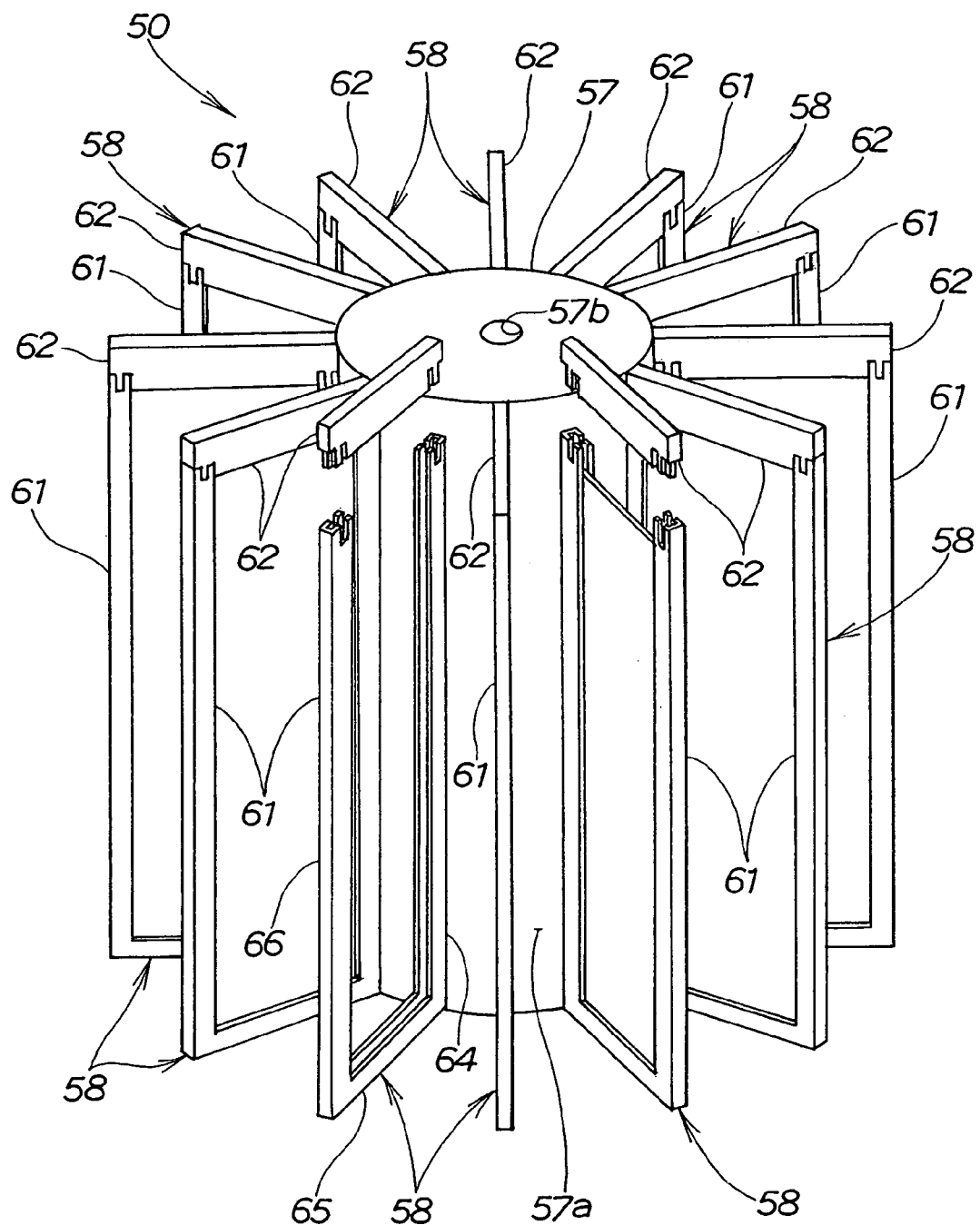
FIG. 13 is a perspective view of a cylindrical holding jig according to the third embodiment of the invention.

As shown in FIG. 13, the cylindrical holding jig 50 is made up of a cylinder part 57 and frame members 58 . . . mounted to the circumferential face 57a of the cylinder part 57 and uniformly spaced in the circumferential direction to hold the separator workpieces 20. 57b is a through hole for the shaft 53 (see FIG. 12) to pass through.

The frame members 58 are each made up of a U-shaped frame proper 61 and a top fitting member 62 which fits to the top of this frame proper 61.

Each frame proper 61 is made up of a cylinder-mounted part 64 mounted to the cylinder part 57, a frame bottom part 65 extending outward from the bottom end of this cylinder-mounted part 64, and a parallel part 66 which rises from this frame bottom part 65 and is parallel with the cylinder-mounted part 64.

Figure 14A:
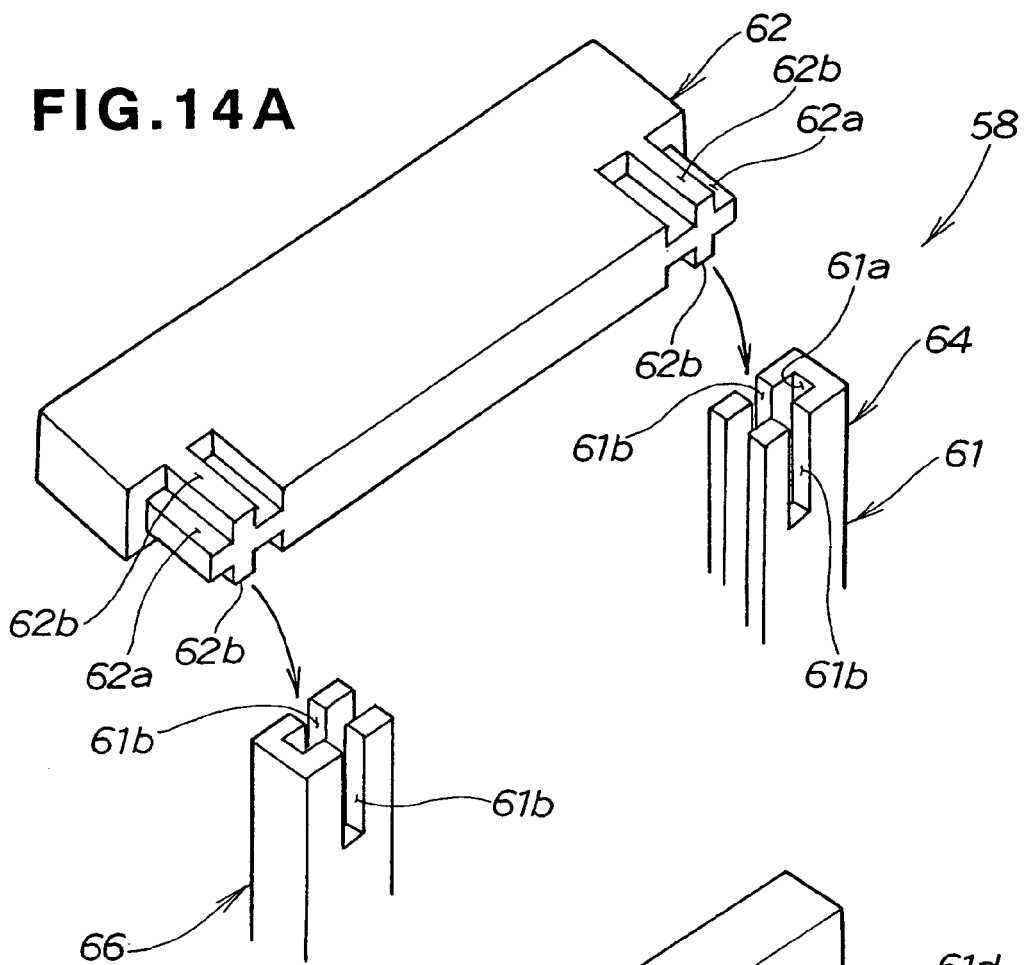
FIG. 14A and FIG. 14B are perspective views illustrating details of the cylindrical holding jig of the third embodiment of the invention, FIG. 14A being a perspective view showing a top fitting member before it is fitted to a frame proper, and FIG. 14B being a perspective view showing the top fitting member after it is fitted to a frame proper.

As shown in FIG. 14A, the frame proper 61 of each of the frame members 58 has a separator insertion groove 61a formed in the cylinder-mounted part 64, the frame bottom part 65 (see FIG. 13) and the parallel part 66 for inserting the edge of a separator workpiece 20 into, and cutaways 61b, 61b formed in the upper ends of the cylinder-mounted part 64 and the parallel part 66.

The top fitting member 62 has plate-shaped insertable parts 62a, 62a where it is formed into a plate shape and the plate thickness is made smaller than around there, for insertion into the separator insertion groove 61a in the frame proper 61, and fitting parts 62b, 62b projecting from the plate-shaped insertable parts 62a, for fitting into the cutaways 61b, 61b in the frame proper 61.

By the cutaways 61b, 61b being provided in the frame proper 61 and the fitting parts 62b, 62b being provided on the top fitting member 62 like this, the cylinder-mounted part 64 and the top fitting member 62, and the parallel part 66 and the top fitting member 62, can be fitted together surely.

Figure 14B:
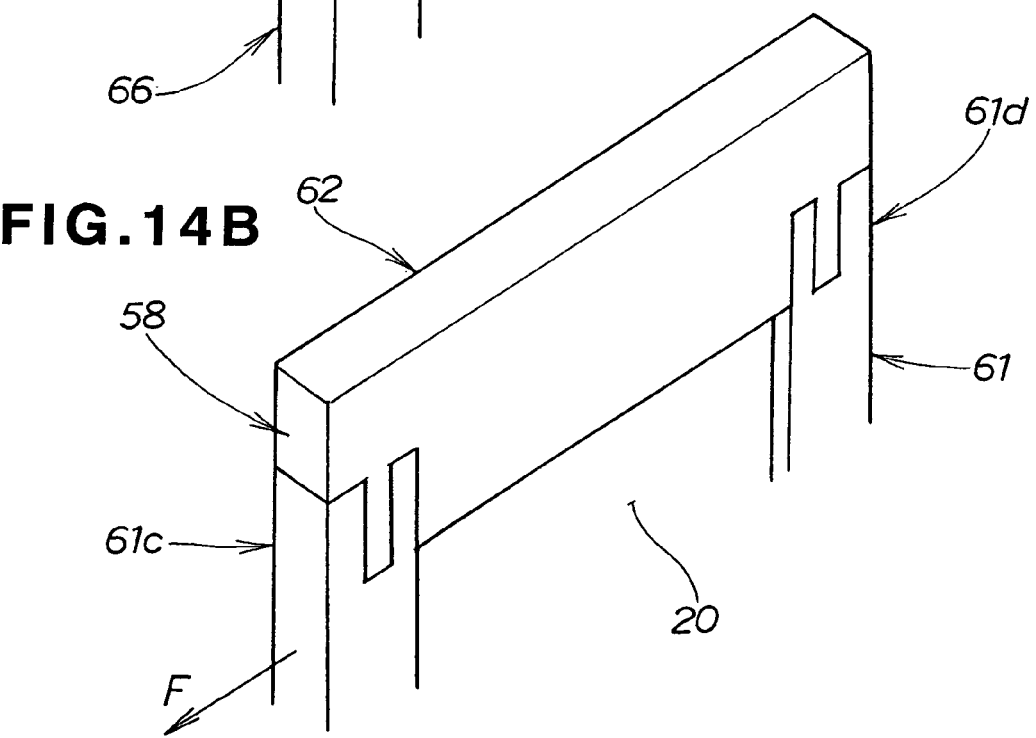

FIG. 14B shows a separator workpiece 20 fitted in the separator insertion groove 61a in the frame proper 61 of a frame member 58 and a top fitting member 62 fitted to the top of the frame proper 61.

In this state, for example even if an external force F acts in the direction of the arrow on the parallel part 66 of the frame proper 61, because the cylinder-mounted part 64 and the parallel part 66 of the frame proper 61 are mated with the top fitting member 62, the frame proper 61 is strong and can be prevented from deforming.

Figure 15:
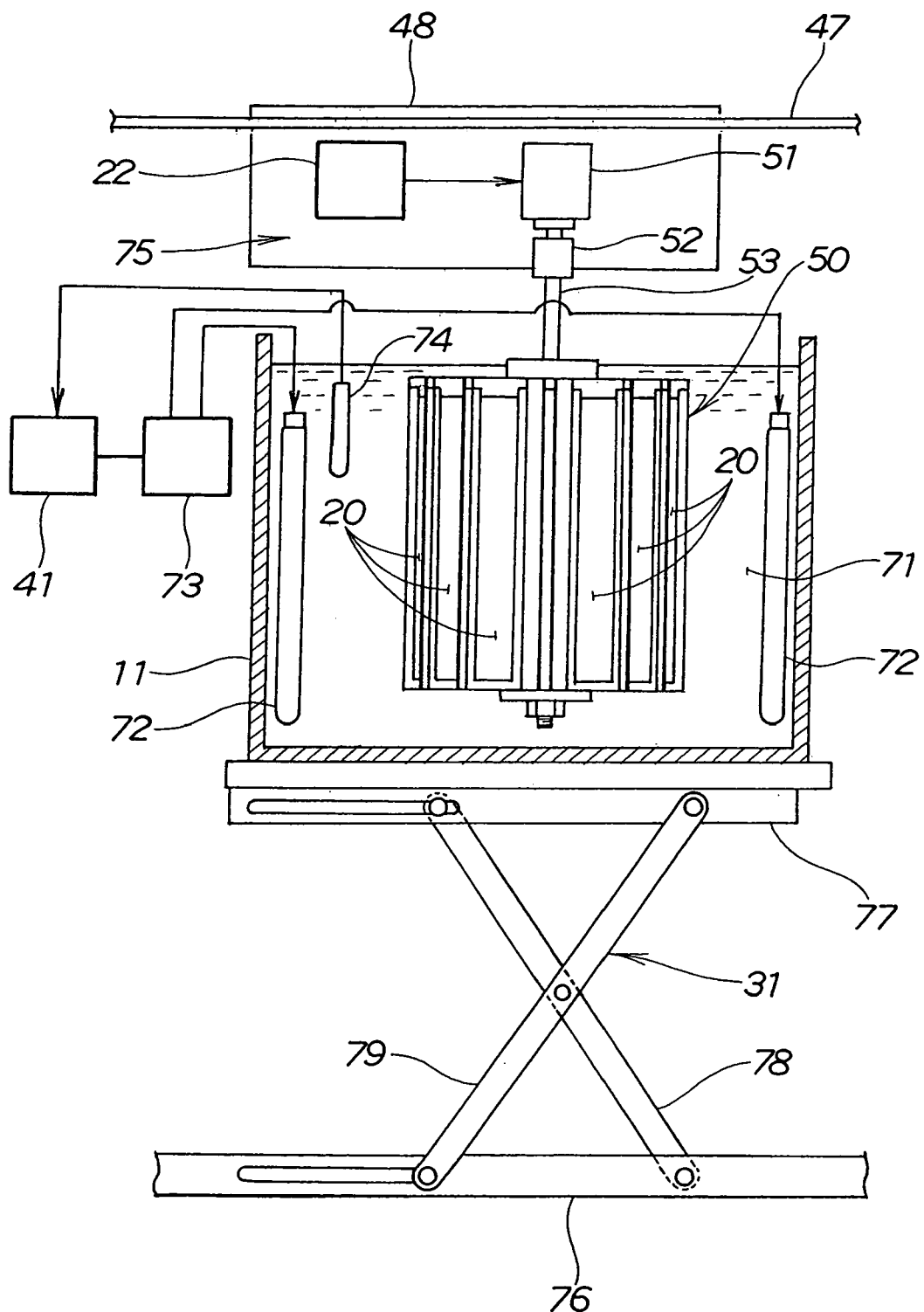
FIG. 15 is a side elevational view illustrating a separator treatment state of the third embodiment of the invention.

FIG. 15 shows for example the first lifter 31 having been driven to raise the first process tank 11 with respect to separator workpieces 20 . . . held by the cylindrical holding jig 50 to immerse the separator workpieces 20 . . . in the process liquid 71.

The electric motor 51 and the driving part 22 constitute a cylindrical holding jig driving device 75 serving as driving means for driving, i.e. rotating, the cylindrical holding jig 50.

For example, with the separator workpieces 20 immersed in the process liquid 71, if the output shaft of the electric motor 51 is rotated in a fixed direction, or if forward and reverse rotation are repeated, the separator workpieces 20 . . . rotate along with the cylindrical holding jig 50 and agitate the process liquid 71. As a result, the treatment of the separator workpieces 20 with the process liquid 71 can be quickened, and also by the agitation of the process liquid 71 the process liquid 71 becomes uniform inside the first process tank 11, and the treatment of the separator workpieces 20 can be carried out evenly.

The flow of the separator manufacturing method of this third embodiment is the same as the flow of ST51 through ST57 shown in FIG. 7.

Figure 16:
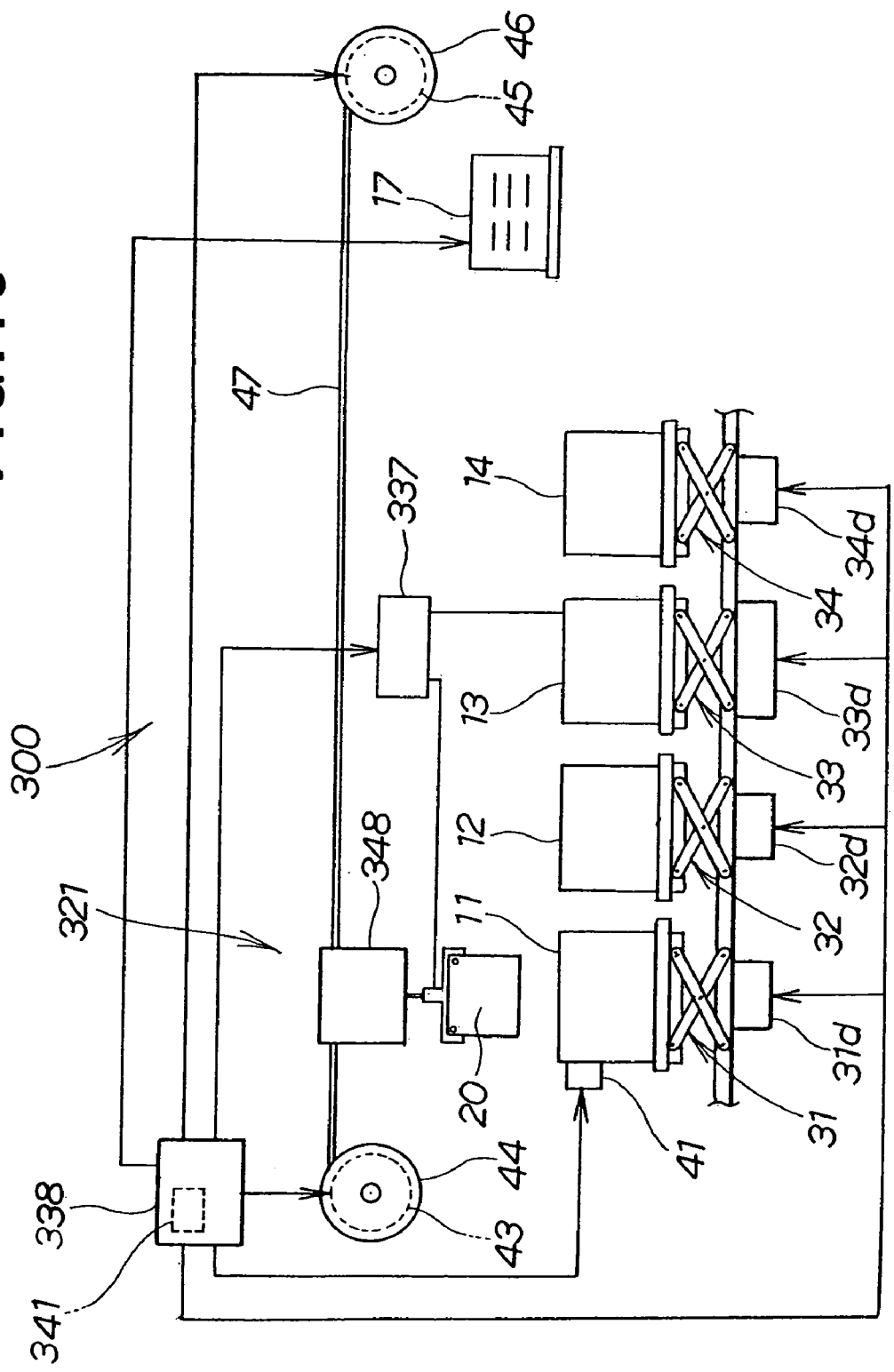
FIG. 16 is a schematic view illustrating a fuel cell separator manufacturing apparatus according to a fourth embodiment of the invention.

A separator manufacturing apparatus 300 of a fourth embodiment shown in FIG. 16 is made up of a first process tank 11 through a fourth process tank 14 and a dryer 17, a carrying apparatus 321 for carrying separator workpieces 20 constituting metal materials to become separators to the positions of the first process tank 11 through the fourth process tank 14 and the dryer 17, a first lifter 31 through a fourth lifter 34, liquid temperature control devices 41 . . . (although the first process tank 11 through the fourth process tank 14 are each provided with one of these liquid temperature control devices 41, in the figure one has been drawn only on the first process tank 11), an electricity supply 337 serving as electricity supplying means for supplying electricity to an electrode inserted into the process liquid in the third process tank 13 (the details of this will be discussed later) and a separator workpiece 20 immersed in the process liquid in the same third process tank 13, and a control unit 338 serving as electrical potential control means for controlling the dryer 17, the carrying apparatus 321, the first lifter 31 through the fourth lifter 34, the liquid temperature control devices 41 and the electricity supply 337. 341 is a timer provided in the control unit 338.

The above-mentioned first process tank 11 is a degreasing tank, the second process tank 12 and the fourth process tank 14 are washing tanks for rinsing with water, and the third process tank 13 is an electrolytic etching and passivation treatment tank (the details of which will be discussed later).

The dryer 17 is a device operated and stopped by an ON/OFF signal from the control unit 338.

The carrying apparatus 321 is made up of a first drum 44, a second drum 46, a cable 47, and a separator carrying part 348 attached to this cable 47.

The timer 341 is for supplying to the control unit 338 a time signal for setting a treatment time of the electrolytic etching and passivation treatment carried out in the third process tank 13.

Figure 17:
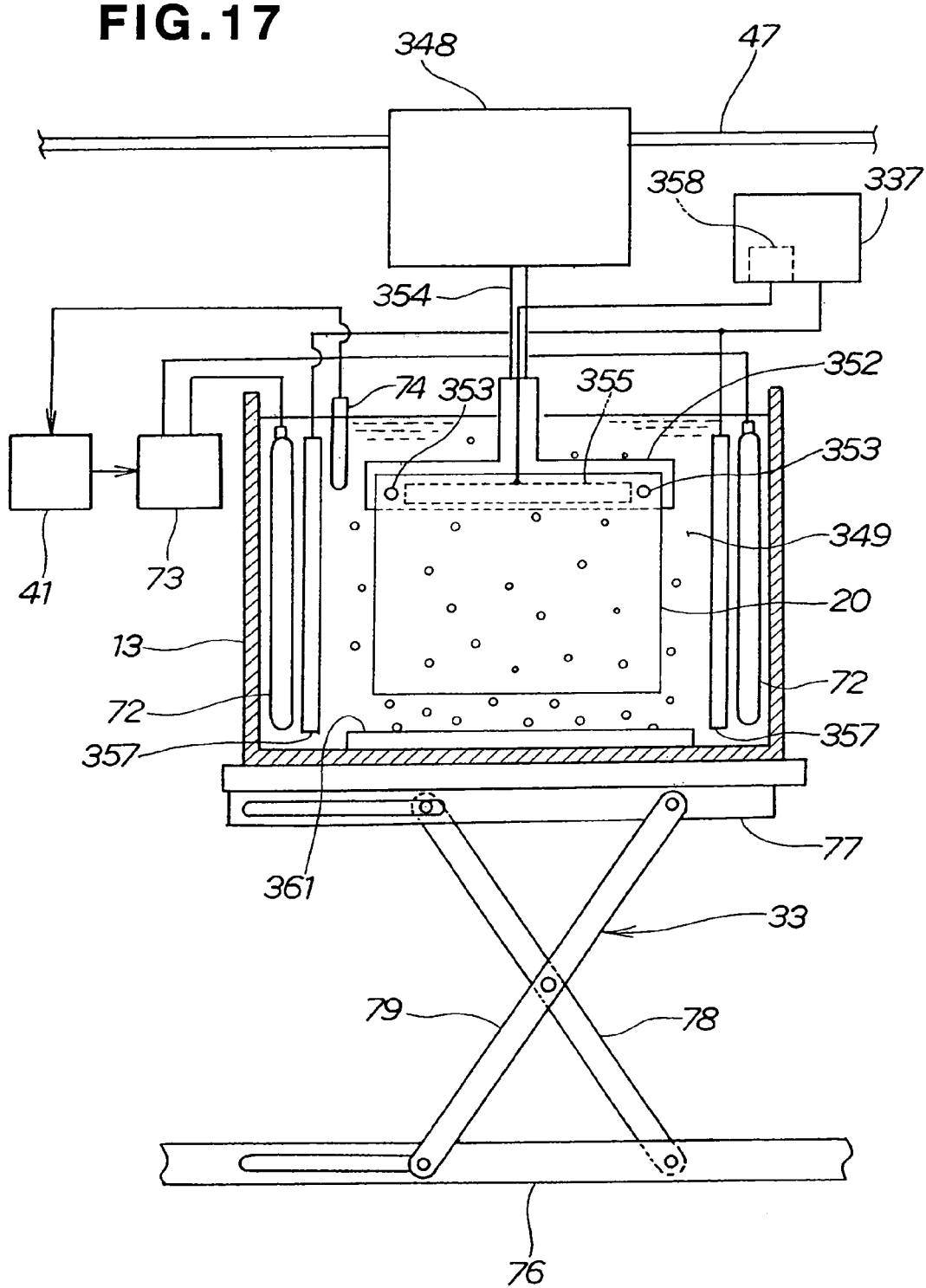
FIG. 17 is a side elevational view illustrating a separator treatment state of the fourth embodiment o the invention.

FIG. 17 shows for example the third lifter 33 having been driven to raise the third process tank 13 with respect to a separator workpiece 20 and immerse the separator workpiece 20 in a process liquid 349 contained in the third process tank 13.

The separator workpiece 20 is attached to a T-shaped separator holding member 352 by fasteners 353, 353, and this separator holding member 352 is attached to the separator carrying part 348 by a wire 354. 355 is a contact point part provided on the separator holding member 352 so as to make contact with the separator workpiece 20, and is a part for supplying electricity from the electricity supply 337.

357, 357 are electrodes provided in the third process tank 13 so as to be immersed in the process liquid 349, and by electricity being supplied from the electricity supply 337 to these electrodes 357, 357 and the above-mentioned separator workpiece 20, electrolytic etching and a passivation treatment, which will be discussed later, are carried out on the separator workpiece 20 in the third process tank 13. The supply of current is carried out by the electricity supply 337 being connected as a d.c. power source so that the separator workpiece 20 becomes an anode and the electrodes 357, 357 become cathodes.

358 is a current density detecting device serving as current density detecting means which has an ammeter for detecting the current value of when electricity is supplied from the electricity supply 337 to the separator workpiece 20 and the electrodes 357, 357 and obtains a current value per unit area, i.e. a current density, from the current value detected with this ammeter and the surface area of one of the electrode plates 357.

361 is an air agitating device disposed at the bottom of the third process tank 13 for agitating the process liquid 349 by continuously making air bubbles.

Figure 18:
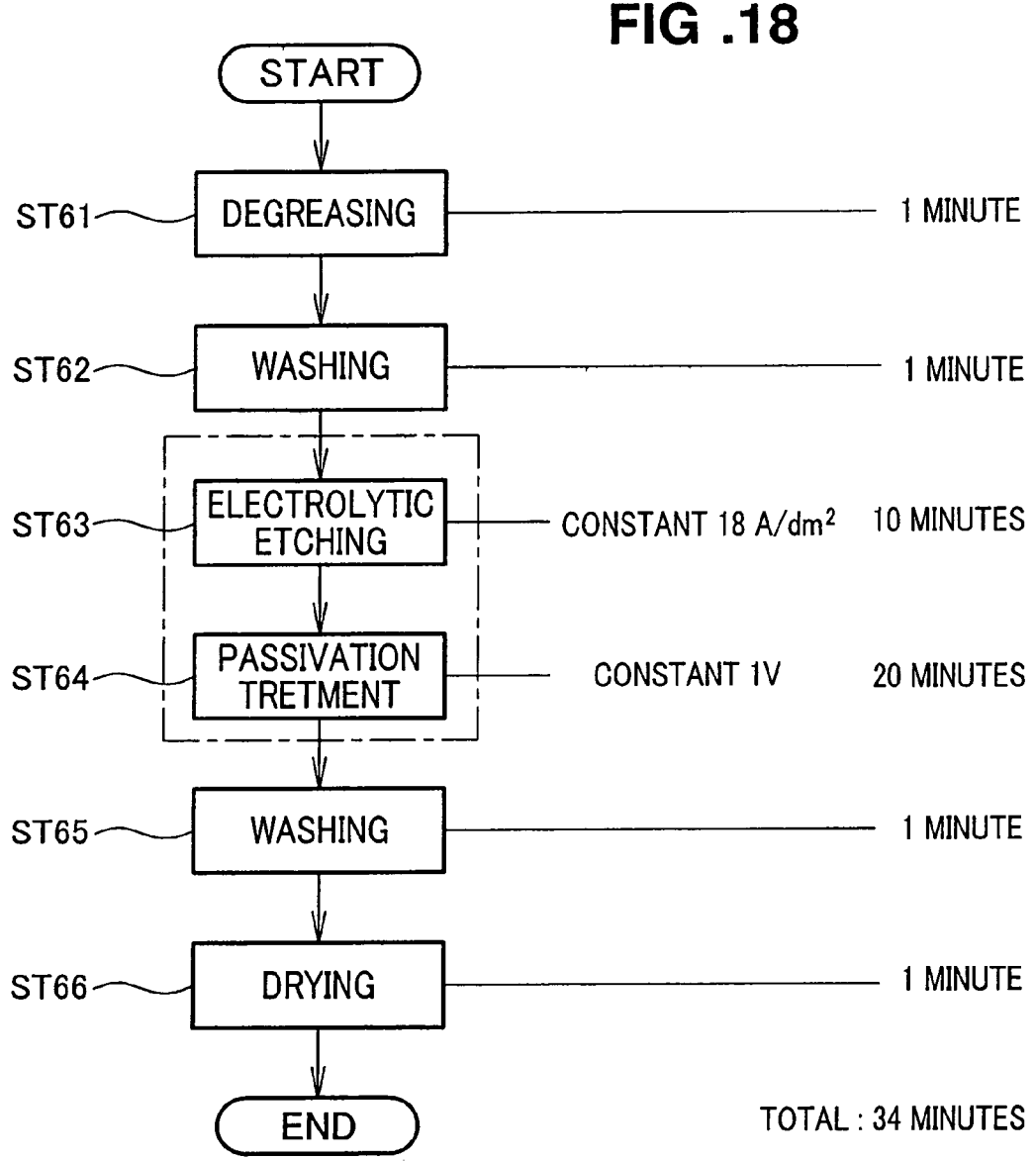
FIG. 18 is a flowchart showing a separator manufacturing method according to the fourth embodiment of the invention.

In FIG. 18, the flow of the separator manufacturing method of the fourth embodiment is explained.

ST61 A separator workpiece is degreased. The process time is 1 minute.

ST62 The separator workpiece is washed. The process time is 1 minute.

ST63 Electrolytic etching is carried out to remove the abnormal layer formed on the separator workpiece and to expose conductors included in the surface layer part of the separator workpiece.

The process liquid is a solution made up of 30% phosphoric acid, 25% sulfuric acid, 10% nitric acid, 5% hydrogen peroxide, 1% surfactant and the rest water (the respective units are weight %), the temperature of the process liquid is 40° C., the current density during electricity supply to the separator workpiece and the electrodes is 18 A/dm$^2$ fixed, the agitating method is air agitation, and the process time is 10 minutes.

ST64 With the potential difference between the separator workpiece and the electrodes made a constant 1 V, a passivation treatment is carried out on the surface of the separator workpiece and a passivation film is formed. The temperature of the process liquid is 40° C., and the process time is 20 minutes. The constituents of the process liquid, the temperature and the agitation method are the same as in ST63.

ST65 The separator workpiece is washed. The process time is 1 minute.

ST66 The separator workpiece is dried. The required time is 1 minute.

This completes the manufacture of the separator. The time required for the manufacture described above is 34 minutes, and is 103 minutes shorter than the 137 minutes required for the related art described with reference to FIG. 22.

The process steps described above are carried out with the separator workpiece being moved to the positions of the respective process tanks and the dryer.

That is, the degreasing of ST61 is carried out in the position of the first process tank, the washing of ST62 in that of the second process tank, the electrolytic etching of ST63 and the passivation treatment of ST64 in that of the third process tank, the washing of ST65 in that of the fourth process tank, and the drying of ST66 in that of the dryer.

By the process steps described above, in the same way as that shown in FIG. 8A through FIG. 8C, abnormal layer removal and conductor exposure are carried out by electrolytic etching and then a passivation film is formed by a passivation treatment.

Figure 19:
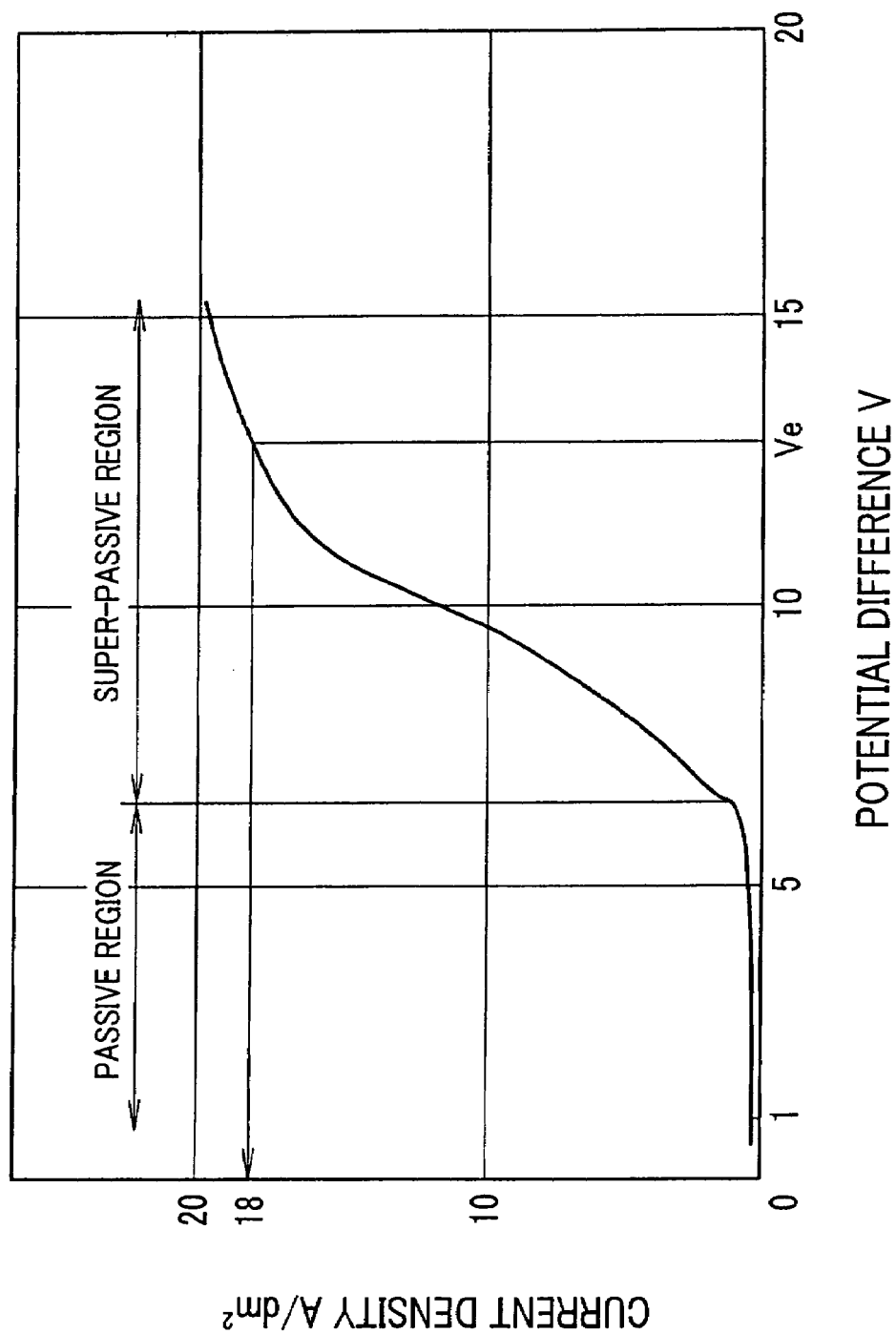
FIG. 19 is a graph illustrating the separator manufacturing method of the fourth embodiment of the invention.

In FIG. 19, the relationship between the potential difference and the current density of the electrolytic etching and passivation treatment explained with FIG. 18 is illustrated with a graph. The vertical axis of the graph shows the current density obtained with the current density detecting device 358 (the units are A/dm$^2$), and the horizontal axis shows the potential difference between the separator workpiece 20 and the electrodes 357 (the units are V).

In the range of potential difference applied between the separator workpiece and the electrodes up to an upper limit of about 6V, even when the potential difference is increased, the current density increases very little.

This is because while the potential difference is small a passive film of an insulating or almost insulating nature, which is a metal oxide film, forms on the surface of the separator workpiece, and this passive film makes it difficult for current to flow. This range of potential difference is called the passive region.

When the potential difference is made larger than the passive region, the current density sharply increases.

This is because current is expended on both oxygen production and dissolving of the separator workpiece (the abnormal layer and the separator workpiece itself), and furthermore the rate of dissolving becomes higher than the forming of the metal oxide film. This range of potential difference is called the super-passive region.

Accordingly, if the above-mentioned super-passive region is used for the electrolytic etching, removal of the abnormal layer of the separator workpiece and removal of the surface of the separator workpiece itself for conductor exposure can be carried out. And by using the above-mentioned passive region for the passivation treatment, a passivation film can be formed.

In the electrolytic etching, the potential difference Ve is adjusted, that is, potential-controlled, for example so that the current density becomes a constant 18 A/dm$^2$.

In the passivation treatment, for example the potential difference is kept at a constant 1 V.

Figure 20:
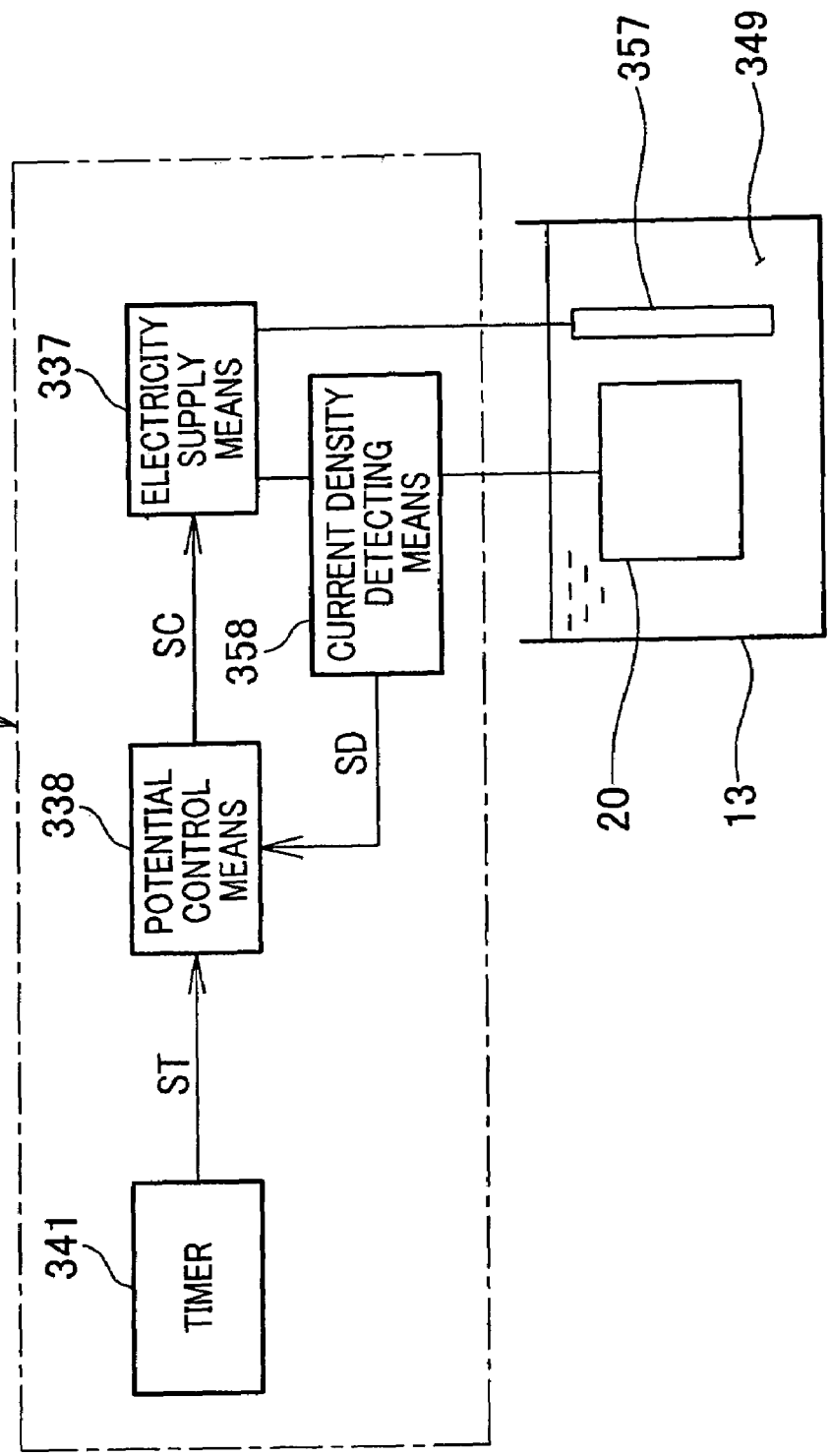
FIG. 20 is a block diagram illustrating main parts of the separator manufacturing apparatus of the fourth embodiment of the invention.
Figure 21:
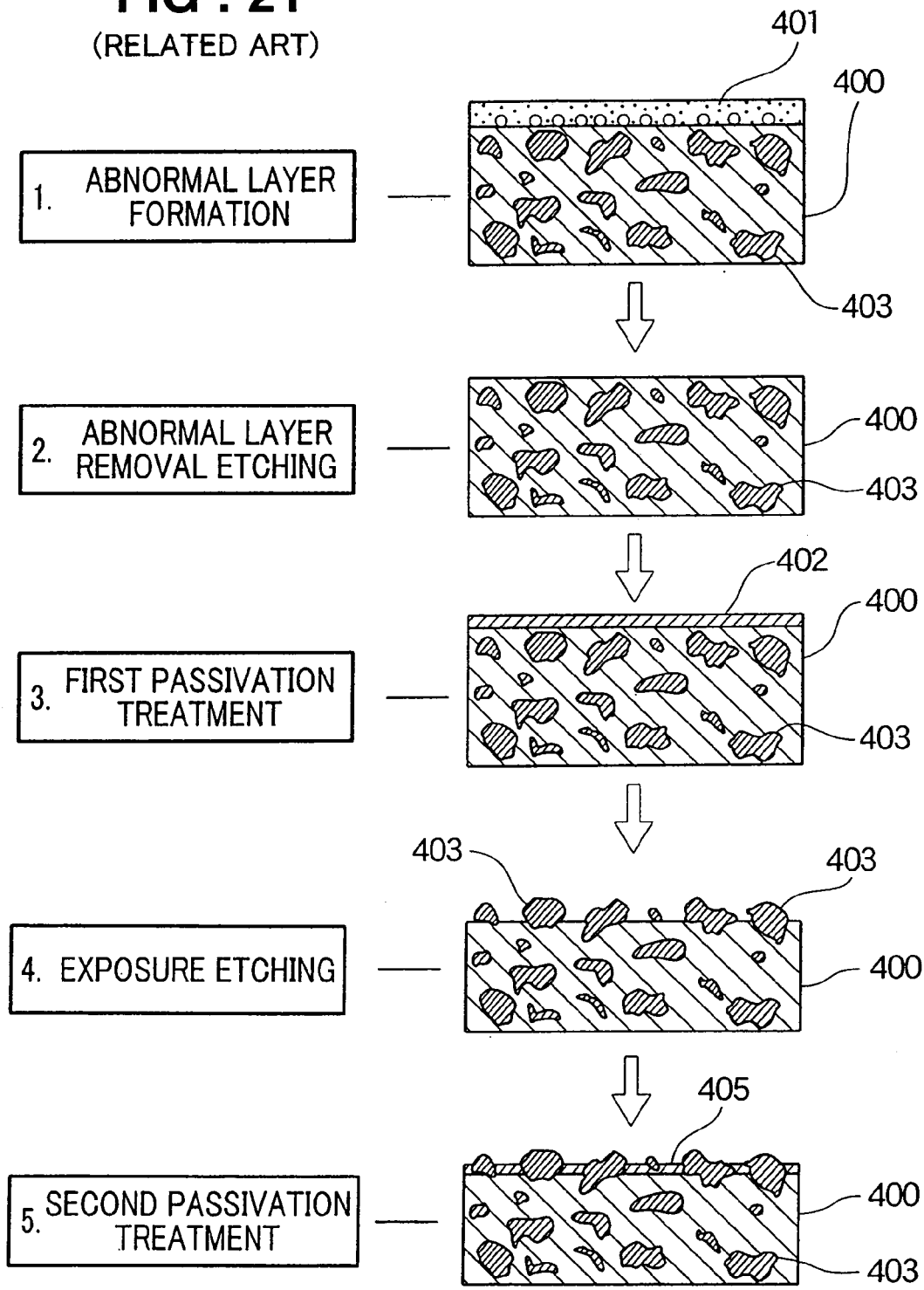
FIG. 21 is a schematic view illustrating the main points of metal separator manufacture of related art.

In FIG. 20, a construction for the potential control of the electrolytic etching and the passivation treatment is illustrated.

A potential control device 395 of the separator manufacturing apparatus 300 is made up of the timer 341 (see also FIG. 16) for generating the time signal ST, potential control means 338 (in fact the control unit 338 (see FIG. 16)) for setting the treatment times of the electrolytic etching and the passivation treatment on the basis of the time signal ST from this timer 341 and controlling the potential difference for the electrolytic etching and the passivation treatment, electricity supply means 337 (in fact the electricity supply 337 (see FIG. 16)) for supplying electricity to the separator workpiece 20 and the electrodes 357 in accordance with a control signal SC from this potential control means 338, and current density detecting means 358 (in fact the current density detecting device 358 (see FIG. 17)) for detecting the current density when electricity is supplied by this electricity supply means 337 and supplying a current density signal SD to the potential control means 338 on the basis of the detected current density.

At the time of the electrolytic etching, when electricity is supplied from the electricity supply means 337 to the separator workpiece 20 and the electrodes 357, on the basis of the current density detected by the current density detecting means 358 at this time, the potential control means 338 controls the electricity supply means 337 so that the potential difference between the separator workpiece 20 and the electrodes 357 is 18 V.

For example, if the current density detected by the current density detecting means 358 is smaller than 18 A/dm$^2$ the potential control means 338 controls the electricity supply means 337 to increase the current density so that the potential difference between the separator workpiece 20 and the electrodes 357 increases, and if the detected current density is greater than 18 A/dm$^2$, the potential control means 338 controls the electricity supply means 337 to decrease the current density so that the potential difference between the separator workpiece 20 and the electrodes 357 decreases, and the current density is thereby kept at a constant 18 A/dm$^2$.

At the time of the passivation treatment, the potential control means 338 controls the electricity supply means 337 so that the potential difference between the separator workpiece 20 and the electrodes 357 is a constant 1 V.

The weight measuring means of this invention is not limited to one of a type like the weight sensor 49 shown in FIG. 1, and alternatively it may be one installed on a work table or the like, separately from the separator workpiece carrying apparatus.

Although in FIG. 13 the frame members 58 were each made up of a cylinder-mounted part 64 and a frame bottom part 65 and a parallel part 66, there is no limit to this, and alternatively the frame members may each be made up of a frame bottom part 65 extending outward from the cylinder part 57 and a parallel part 66 and a groove for inserting the edge of a separator may be formed in the circumferential face 57a of the cylinder part 57 and the top fitting member 62 may be fitted to the top ends of the cylinder part 57 and the parallel part 66.

Also, although the electrolytic etching step and the passivation treatment step following this step were carried out consecutively in the same process tank using potential control, there is no limit to this, and alternatively the electrolytic etching step and the passivation treatment step may be carried out using potential control consecutively in different process tanks filled with different process liquids.

INDUSTRIAL APPLICABILITY

The fuel cell separator manufacturing method of this invention includes an abnormal layer removal step of removing an abnormal layer which forms at the surface layer of a metal material for use as separator when it is rolled and becomes a cause of conductivity decrease, a conductor exposing step of causing portions of conducting matter constituting good conductors naturally included in the surface layer part of the metal material itself to project, and a passivation treatment step of performing a passivation treatment on the surface layer part of the metal material itself. As a result, abnormal layer removal and conductor exposure for lowering the electrical contact resistance of the metal material and raising its resistance to corrosion can be carried out chemically or electro-chemically in the same process, and the number of process steps can be cut. Thus, the invention is useful in the manufacture of fuel cells and other electrical components (for example primary cells, secondary cells, capacitors) in which surface treatment of a metal material is necessary.

The invention claimed is:

1. A fuel cell separator manufacturing method comprising:
   (a) rolling with rolling means a metal material to be used as a fuel cell separator;
   (b) forming the rolled material into a predetermined shape with pressing means;
   (c) removing an abnormal layer arising at the surface of the metal material when it is rolled and press-shaped;
   (d) exposing portions of conductors included in the surface of the metal material; and
   (e) passivating the surface of the metal material,
   wherein the method further comprises a step of, after said forming step and before said removing step, examining the abnormal layer to observe the conductors extending therefrom and, based upon this observation, determining a thickness of the abnormal layer,
   wherein a single etching operation completes (c) and (d), and comprising the further steps of:
   providing a plurality of liquid tanks, each of said liquid tanks holding an etching liquid having a different composition than that of the other liquid tanks; and
   selecting a liquid tank to be used from said plurality of liquid tanks based upon the determined thickness of the abnormal layer.

2. The fuel cell separator manufacturing method according to claim 1, wherein the etching liquid in each tank has a predetermined temperature and concentration, and is agitated at a predetermined rate, and wherein the predetermined temperature, concentration, and agitation rate is selected so as to provide a relatively different etching rate in each of the liquid tanks.

3. The fuel cell separator manufacturing method according to claim 1, wherein the removal of the abnormal layer is promoted by granular materials mixed with the etching liquid and the etching liquid being agitated.

* * * * *